US011231930B2

(12) United States Patent
Gu et al.

(10) Patent No.: US 11,231,930 B2
(45) Date of Patent: Jan. 25, 2022

(54) METHODS AND SYSTEMS FOR FETCHING DATA FOR AN ACCELERATOR

(71) Applicant: ALIBABA GROUP HOLDING LIMITED, Grand Cayman (KY)

(72) Inventors: Yongbin Gu, San Mateo, CA (US); Pengcheng Li, San Mateo, CA (US); Tao Zhang, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/901,497

(22) Filed: Jun. 15, 2020

(65) Prior Publication Data

US 2021/0157593 A1    May 27, 2021

Related U.S. Application Data

(60) Provisional application No. 62/940,027, filed on Nov. 25, 2019.

(51) Int. Cl.
*G06F 9/38* (2018.01)
*G06F 9/50* (2006.01)
(Continued)

(52) U.S. Cl.
CPC ........ *G06F 9/3802* (2013.01); *G06F 9/30036* (2013.01); *G06F 9/34* (2013.01); *G06F 9/5027* (2013.01)

(58) Field of Classification Search
CPC ...... G06F 9/3802; G06F 9/34; G06F 9/30036; G06F 9/5027; G06F 12/0862; G06F 2212/6028; G06F 9/00
See application file for complete search history.

(56) References Cited

U.S. PATENT DOCUMENTS 11,010,092 B2 * 5/2021 Hasbun .................. G06F 3/0611
2008/0301256 A1   12/2008 McWilliams et al.
(Continued)

FOREIGN PATENT DOCUMENTS

EP          2005712 B1      3/2019

OTHER PUBLICATIONS

Texas Instruments, "TDA2xx and TDA2ex Performance" SPRAC21A—Jun. 2016—Revised Jun. 2019, (retrieved on Dec. 24, 2020). Retrieved from the Internet URL:https://www.ti.com/lit/an/sprac21a/sprac21a.pdf?ts=1608840286496&ref_url=https%253A%252Fwww.google.com%252F pp. 1-50.
(Continued)

*Primary Examiner* — Farley Abad
(74) *Attorney, Agent, or Firm* — Finnegan, Henderson, Farabow, Garrett & Dunner, LLP

(57) ABSTRACT

The present disclosure provides methods, systems, and non-transitory computer readable media for fetching data for an accelerator. The methods include detecting an attempt to access a first page of data that is not stored on a primary storage unit of the accelerator; and responsive to detecting the attempt to access the first page of data: assessing activity of the accelerator; determining, based on the assessed activity of the accelerator, a prefetch granularity size; and transferring a chunk of contiguous pages of data of the prefetch granularity size from a memory system connected to the accelerator into the primary storage unit, wherein the transferred chunk of contiguous pages of data include the first page of data.

17 Claims, 18 Drawing Sheets

(51) Int. Cl.
*G06F 9/30* (2018.01)
*G06F 9/34* (2018.01)

(56) References Cited

U.S. PATENT DOCUMENTS

| | | | |
|---|---|---|---|
| 2011/0161620 A1* | 6/2011 | Kaminski | G06F 12/1009 |
| | | | 711/207 |
| 2011/0320415 A1* | 12/2011 | Berger | G06F 16/24552 |
| | | | 707/692 |
| 2012/0159013 A1 | 6/2012 | Dimond | |
| 2013/0081013 A1 | 3/2013 | Plondke et al. | |
| 2016/0048401 A1* | 2/2016 | Bhat | G06F 3/0604 |
| | | | 718/1 |
| 2016/0246597 A1 | 8/2016 | Ben-Kiki et al. | |
| 2016/0371179 A1 | 12/2016 | Stark et al. | |
| 2017/0277246 A1* | 9/2017 | Nicholson | G06F 1/3293 |
| 2018/0089087 A1* | 3/2018 | Chang | G06F 12/0868 |
| 2019/0324919 A1* | 10/2019 | Koker | G06F 12/1027 |

OTHER PUBLICATIONS

International Search Report and written opinion in related International Application No. PCT/US2020/057676, dated Feb. 2, 2021 (14 pgs.).

\* cited by examiner

METHODS AND SYSTEMS FOR FETCHING DATA FOR AN ACCELERATOR

CROSS-REFERENCE TO RELATED APPLICATION

This disclosure claims the benefit of priority to U.S. Provisional Patent Application No. 62/940,027, filed on Nov. 25, 2019, which is incorporated herein by reference in its entirety.

TECHNICAL FIELD

The present disclosure generally relates to accelerators, and more particularly, to methods, systems, and non-transitory computer readable media for fetching data for us by an accelerator.

BACKGROUND

Heterogenous computer systems employing accelerators have become an important component of many modern-day computer systems. Many of these computer systems employ a unified virtual memory architecture, allowing central processing units and accelerators to share a virtual memory space. While beneficial, managing a unified virtual memory space can present challenges, with memory oversubscription, frequent page migrations between primary storage units, and inefficient memory usage all being potential causes of degraded system performance. An important component of handling these challenges is prefetching, which, if done inefficiently, can degrade system performance.

SUMMARY OF THE DISCLOSURE

The embodiments of the present disclosure provide methods, systems, and non-transitory computer readable media for fetching data an accelerator. The methods include detecting an attempt to access a first page of data that is not stored on a primary storage unit of the accelerator; and responsive to detecting the attempt to access the first page of data: assessing activity of the accelerator; determining, based on the assessed activity of the accelerator, a prefetch granularity size; and transferring a chunk of contiguous pages of data of the prefetch granularity size from a memory system connected to the accelerator into the primary storage unit, wherein the transferred chunk of contiguous pages of data include the first page of data.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that the foregoing general description and the following detailed description are exemplary and explanatory only, and are not restrictive of the invention, as claimed.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
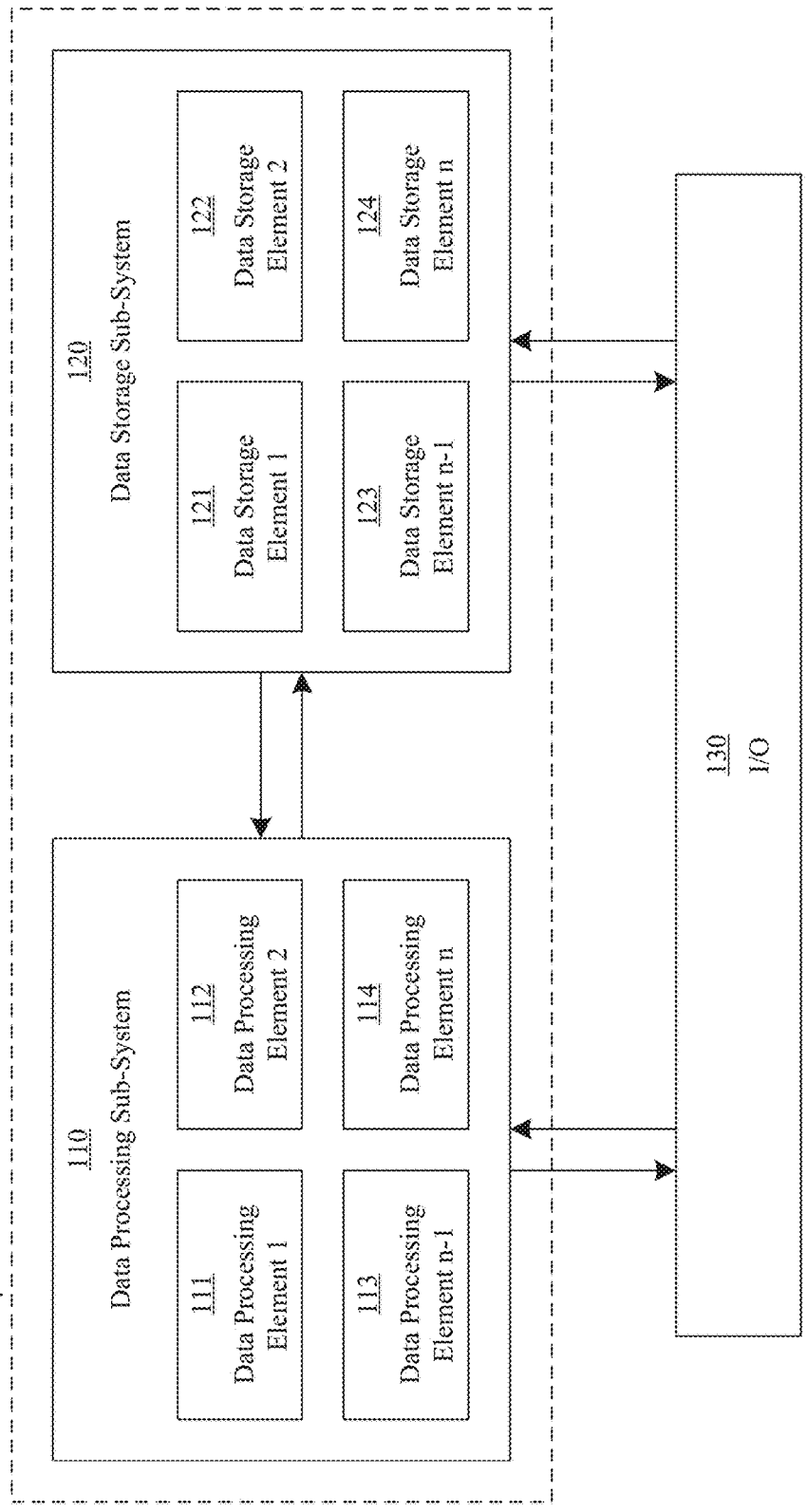
FIG. 1 is a simplified diagram illustrating a general Von Neumann architecture.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

For most modern-day computers systems, the design, architecture and performance of the computer system's memory is of particular importance. Due to a variety of factors stemming from the physics of the materials used to implement most modern-day computing hardware (such as the use of silicon), the performance of a computer system's memory tends to be a bottleneck in the system's performance. For this reason, in most modern-day systems, a large amount of the systems resources (e.g., a significant proportion of the circuitry) are devoted to complex memory subsystems designed to reduce and ameliorate the impact of this memory bottleneck.

In large part, the significance of memory to a computer system's performance can be ascribed to the basic underlying architecture used by most modern-day computer systems. Of course, the use of this architecture is itself driven by various underlying physical constraints, which make it a (currently) better choice than alternative architectures, despite the potential performance bottlenecks it introduces.

To better understand why memory is often a bottleneck on many computer system's performance, it is useful to have an overview of their basic design. Starting from the very basics, a computer, in an abstract sense, can be thought of as a device capable of automatically carrying out a sequence of operations. These operations are primitive, meaning the computer system can carry them out without additional explanation; informally, the computer system understands these operations. Because of this requirement, primitive operations are usually (but not necessarily) relatively simple, leading most such operations to be some type of arithmetical or logic-based process (e.g., "add these two numbers together"). Of course, these operations can be combined together to achieve more complex results—this is essentially what a program is, i.e., a series of operations devoted to a particular task. Additionally, an operation almost always has an associated label, known as an instruction, which can be used to identify (and instruction the computer to perform) a particular operation.

This base definition of "computer" is a very broad definition, as this definition covers most system capable of automatically carrying out a sequence of operations, regardless of its construction or architecture (i.e., regardless of the implementation details). Because of this open-endedness, this definition allows for an enormous number of possible systems—and general system architectures—that could be used to make a "computer." Much of this variation concerns what primitive operations are made available, how the instructions determining what operations are to be performed is handled, and how input and output to these operations is handled. For computer science and related fields, virtually any of these architectures may be used, though usually the simply, more easily worked with ones are chosen (e.g., a "Turing Machine"). However, to implement computers in physical reality, one must contend with various constraints imposed by physics, particularly the properties of the materials available to be used. Ultimately, based on a variety of factors, the architecture found most suitable by most modern-day computer systems is the Von Neumann architecture or variants based thereon.

Conceptually, a computer based on the Von Neumann architecture can be thought of as two interacting sub-systems: a data processing sub-system and a data storage sub-system. As suggested by its name, the data processing sub-system is responsible for performing the various (primitive) operations of the computer system. The data processing sub-system is essentially tasked with carrying out the actual computation performed by the computer-system. On the other hand, the data storage sub-system is responsible for storing the programs (and thus the instructions making up the program) used to direct the data processing sub-system. Additionally, the data storage sub-system is also responsible for storing the various data used as input to (or resulting as output from) the various operations performed by the data processing sub-system. This data can be included at the very initialization/start of the program (e.g., before or as the data processing sub-system starts performing the operation indicated by the first instruction of the program) or the data may originate as the stored output of some previous operation performed by the data processing sub-system.

Modern-day computer systems generally employ generalized variants of the Von Neumann architecture. In these generalized variants, the data processing sub-system can contain a variety of data processing elements. Similarly, in the generalized Von Neumann architecture, the data storage sub-system can contain a variety of data storage elements. In general, the data processing sub-system includes a core element known as the central processing unit (CPU). Broadly speaking, the CPU is capable of handling a wide variety of tasks adequately (e.g., a CPU has a wide variety of primitive operations available). The CPU is also usually responsible for managing and coordinating the activities of the other data processing elements. These other data processing elements are usually heterogenous. That is, the data processing elements have different performance characteristics and having differing performance dependent upon the particular workload. These additional data processing elements are referred to as accelerators, and they are typically specialized for increased performance on specific operations and workloads, usually at the cost of decreased performance on other workloads.

Similarly, the data storage sub-system generally contains a core element known as the primary storage unit (PSU). In general, the PSU is directly accessible by the data processing sub-system (e.g., the CPU) and is tasked with storing the instructions and data used by the data processing sub-system. Broadly speaking, the PSU is optimized for speed, meaning that the PSU can rapidly handle transferring data to and from the CPU (and data processing elements, generally). As a tradeoff, however, the PSU typically has low storage density, high storage cost, and is volatile, meaning the PSU does not retain data if it loses power. For this reason, the data storage system also usually employs heterogenous data storage elements. That is, the data processing elements have different performance characteristics and having differing performance dependent upon the particular workload. These additional data processing elements are referred to as data storage devices, and they are typically specialized for increased data storage and non-volatility, usually at the cost of decreased speed and increased latency.

FIG. 1 is a simplified diagram illustrating the general Von Neumann architecture just described. According to FIG. 1, Von Neumann architecture 100 is composed of a data processing sub-system 110 and a data storage sub-system 120. Also present is I/O 130, which can provide input and output to data processing sub-system 110 and data storage sub-system 120. As further shown in FIG. 1, data processing sub-system 110 is composed of a variety of data processing elements, shown here as data processing elements 111, 112, 113, and 114. Similarly, data storage sub-system is also composed of a variety of data storage elements, shown here as data storage 121, 122, 123, and 124. As shown by the arrows, data processing sub-system 110 and data storage sub-system 120 may communicate and transfer data between one another.

In the basic version of the Von Neumann architecture, the data processing sub-system is composed only of the CPU and the data storage sub-system is composed only of the PSU. In general, the PSU is directly accessible by the data processing sub-system (e.g., the CPU) and is tasked with storing the instructions and data used by the data processing sub-system. In operation, the data processing sub-system and the data storage sub-system are tightly intertwined, particularly the CPU and PSU. To operate, the CPU must generally retrieve (data representing) the next instruction indicating the next operation to be performed by the CPU from the PSU. This instruction (more precisely, the operation the instruction indicates) may then trigger interactions with yet more data on the PSU (e.g., retrieving input for an arithmetic/logic operation, storing the output of an arithmetic/logic operation, etc.).

Figure 2:
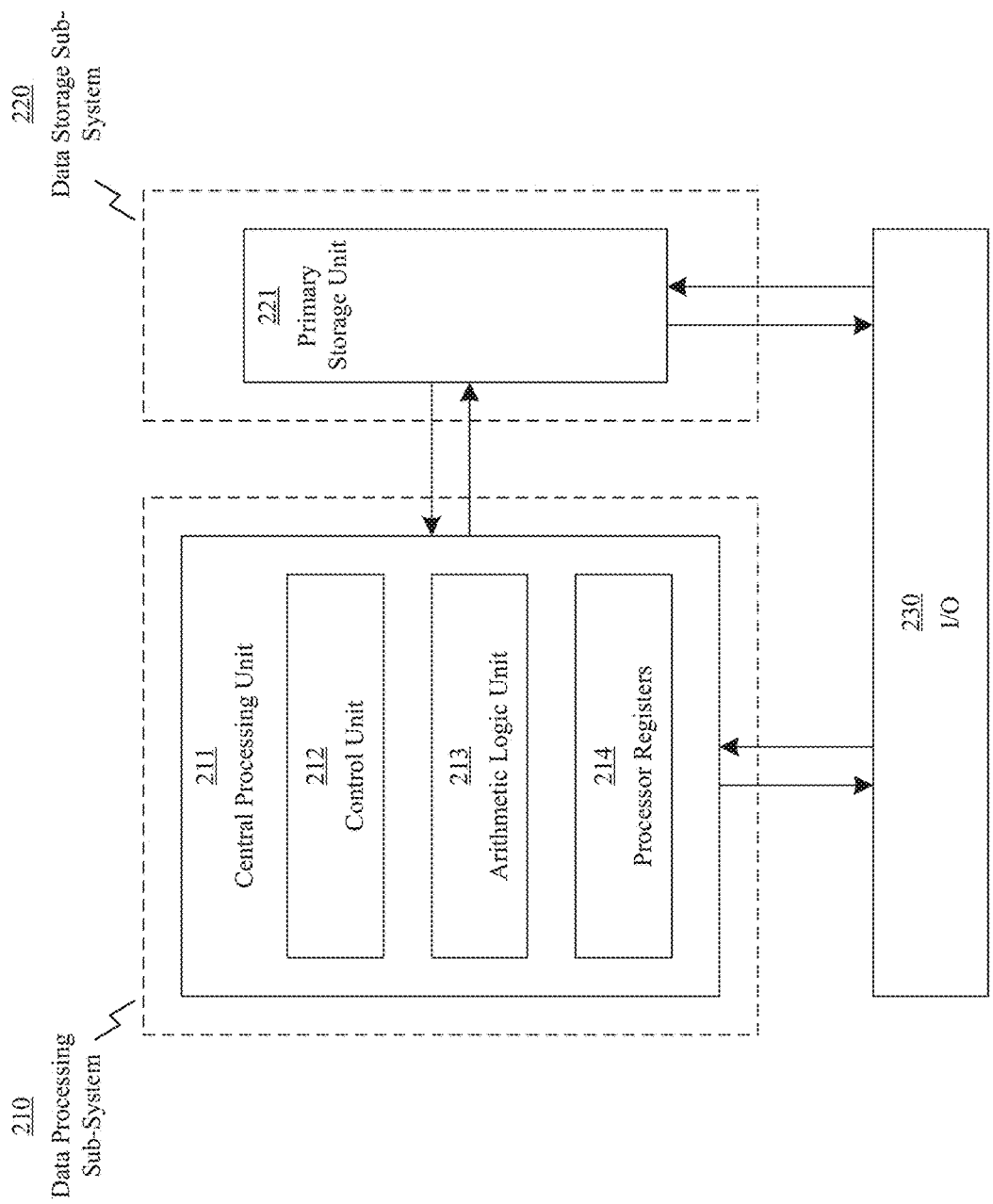
FIG. 2 is a simplified diagram illustrating a basic Von Neumann architecture.

FIG. 2 is a simplified diagram illustrating the basic Von Neumann architecture just described. According to FIG. 2, the basic Von Neumann architecture is composed of a data processing sub-system 210 and a data storage sub-system 220. As shown by the figure data processing sub-system 210 is composed of only one data processing element—central processing unit 211. Similarly, data storage sub-system 220 is also composed of only one data storage element—primary storage unit 221. Also present is I/O 230, which can provide input and output to CPU 211 and primary storage unit 221. Also shown in FIG. 2, are some of the internal components of CPU 211, including control unit 212, arithmetic logic unit 213, and processor registers 214.

The frequent necessity of communication makes the speed at which the data processing sub-system can respond or react to interactions by the data processing sub-system a potential bottleneck in the entire computer system's performance. This bottleneck is referred to as the "Von Neumann bottleneck." Unfortunately, in most modern-day computer systems the Von Neumann bottleneck is a significant problem. For various reasons, the speed at which the processing sub-system—particularly the CPU—operates/interacts with the memory sub-system has increased at a significantly faster rate than the memory sub-system—particular the PSU—operates/responds to the processing sub-system. This trend is sometimes referred to as the "memory wall" or "bandwidth wall." Because of this speed disparity, most modern-day computer systems employ a variety of strategies to reduce or mitigate the impact of the Von Neumann bottleneck and memory wall.

To understand some of the other strategies employed, it is useful to have a more detailed understanding of how the data processing sub-system interacts with the data storage sub-system, with particular attention to how the CPU interacts with the PSU. In turn, to understand how the CPU interacts with the PSU, it is useful to understand some of the internal design and architecture of most CPUs (which also applies to most other data processing elements) and most PSUs. To start, as a general matter, most modern-day computers are based on binary logic. This means that virtually all data in the computer is stored/represented as a series of bits (a unit of information which can only be one of two symbols, which are usually represented as "0" and "1"). Each discrete collection of bits can be interpreted as a binary number (e.g., a number in base-2, such as 0b0001101110001111 (where "0b" indicates the number is in base-2), which is 7055 in base-10). For better human readability, binary numbers are often written as hexadecimal numbers (i.e., base-16) (e.g., the previous binary number 0b0001101110001111 is 0x1B8F, where "0x" indicates the number is in base-16).

As for the data storage sub-system, most PSUs consist of multiple fundamental units known as "memory locations." Each memory location refers to a discrete set of data, each usually of the same, fixed length/size. A memory location can be uniquely identified and addressed by an identifier associated with memory location known as a "physical address." The "first" physical address is typically numbered starting at 0x00000000 and continuing to increment by 1 for every sequential unit (e.g., for 32-bit addresses, 0x00000001, 0x00000002, 0x00000003, 0xFC4A95E3, etc., and for 64-bit addresses 0x0000000000000001, 0x0000000000000002, 0x000009BCFC4A95E3, etc.). Since most modern-day computers are based on binary data, the size of a memory location of most PSUs is some multiple of bits (note that a memory location can be composed of smaller units, called "memory cells," which usually store the value of a single bit; memory cells are usually not directly accessible, however). For most modern-day systems, the size of a memory location is 8 bits, which is also referred to as a byte. This memory design is referred to as "byte-addressable." Similarly, because most modern-day computers use binary numbers to represent data, the physical address is also usually a binary number of a fixed number of bits, which, for convenience, are usually also a fixed number of bytes (e.g., 16-bit (2-byte) physical address, 32-bit (4-byte) physical address, 64-bit (8-byte) physical address). Discrete blocks of data that are larger than a single byte made be stored in a sequence of consecutive addresses. Note that, while all data stored on most PSUs is stored as a binary number, the interpretation of what this data represents (e.g., its data type, such as a string, floating point number, etc.) may vary based on the program/instruction being executed or the operation being performed.

As for the data processing sub-system, CPUs (and most data processing elements) have a set of—usually basic—operations/actions they can perform. Each of these operations/actions is represented and identified by an instruction, which, because of the binary nature of computers, is usually represented by a binary number. The design of the entire set of instructions used by the CPU (and the operations/actions the instructions represent) is referred to as the instruction set architecture. At a high-level, the instruction set architecture of most modern-day systems divides instructions into two broad categories: memory operations and arithmetic/logic operations. This is generally referred to as a load-store architecture. The reason for this separation is that, most CPUs (and most data processing elements generally) cannot directly use data stored in a PSU in (e.g., as input to) an arithmetic operation (nor can most CPUs directly use the output of an arithmetic operation to store data on the PSU). Rather, to use data on the PSU, that data must first be transferred/stored in one of the CPU's processor registers. A processor register is a small memory-holding area used to hold data that is being used (or generated by) the CPU. The processor registers are usually of a fixed-size referred to as a word. The word is, similar to the physical addresses of the PSU, a certain number of bits, which for convenience is also usually a number of bytes (e.g., 16-bit (2-byte) word size, 32-bit (4-byte) word size, 64-bit (8-byte) word size). Only data located in these processor registers may be used as input to an arithmetic/logic operation and only data located in these registers may be stored on the PSU.

In a CPU using a load-store architecture, to transfer (e.g., copy) data into one of the CPU's processor registers, the CPU must be instructed to read data from the PSU and copy the data into a processor register. The CPU reads particular data and copy the data into a particular register using a memory operation (and is instructed to do this using the corresponding instruction). Similarly, the CPU is instructed to write particular data in a register to the PSU using a different memory operation (represented by a different corresponding instruction). Thus, to perform an arithmetic/logic operation using two different data values, the CPU must usually retrieve the load instruction, retrieve the first input, retrieve the second load instruction, retrieve the second input, retrieve the third instruction, and perform the indicated operation using the two values just retrieved as input.

Figure 3:
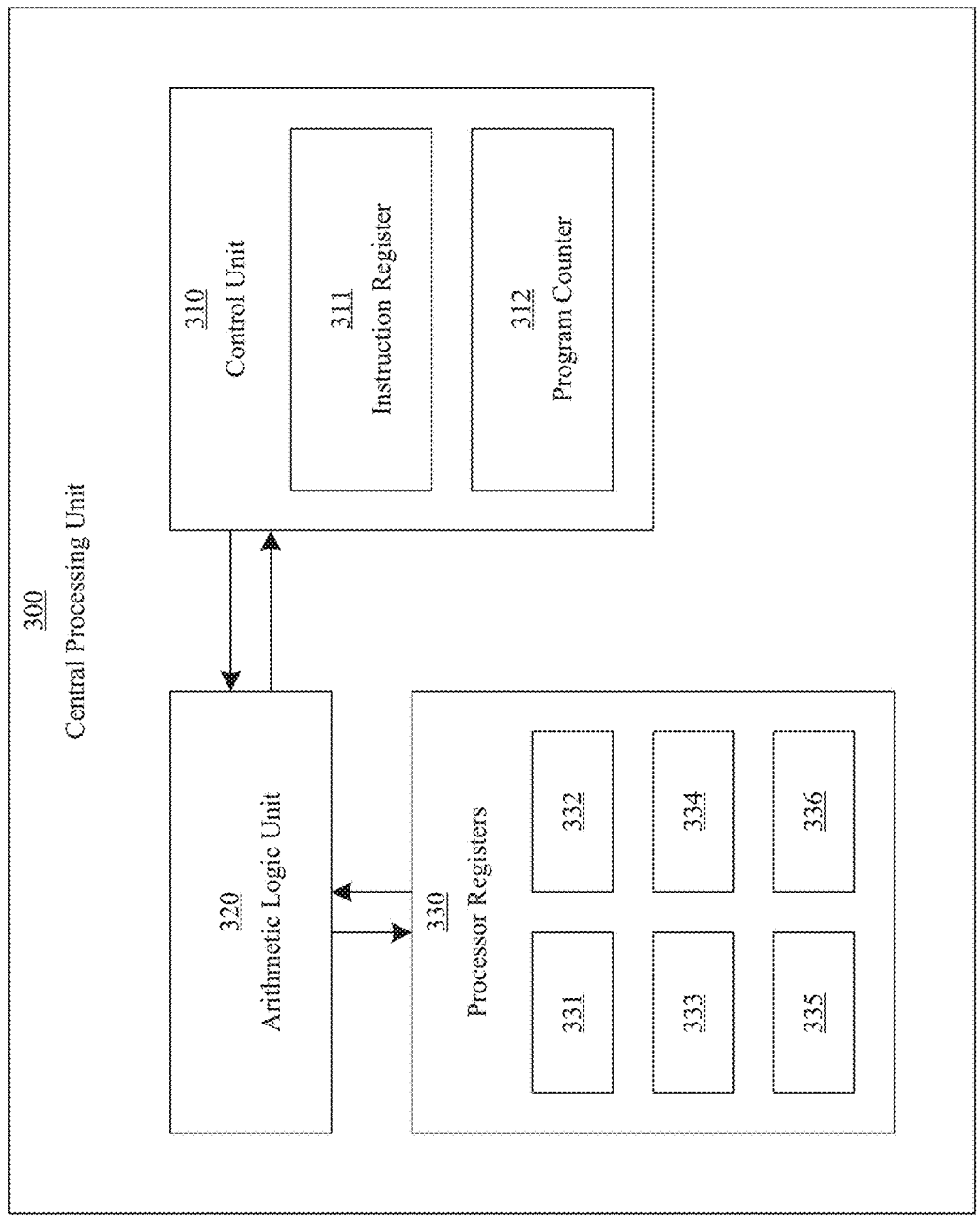
FIG. 3 is a simplified diagram illustrating the internal architecture of a CPU.

FIG. 3 is a simplified diagram illustrating the internal architecture of a CPU as just described. According to FIG. 3, the basic architecture of a CPU comprises a control unit 310, arithmetic logic unit 320, and processor registers 330. Control unit 310 contains instruction register 311 and program counter 312. Control unit 310 also has a connection to a PSU (not shown), from which control unit 310 can retrieve data and instructions. As discussed above, control unit 310 may retrieve instructions from a PSU and store these instructions in instruction register 311. Control unit 310 may also use program counter 312 to store the physical address where the next instruction to be executed is located on the PSU. As FIG. 3 also shows, control unit 310 is connected to arithmetic logic unit 320. Based on the instruction stored in instruction register 311, control unit 310 can configure arithmetic logic unit to perform various operations. Arithmetic logic unit 320 may perform these operations by altering the data stored in processor registers 330, shown here as processor registers 331, 332, 333, 334, 335, and 336.

Note that some systems use an instruction set architecture that is known as a register memory architecture. In these instruction sets, an arithmetic operation may specify data on the PSU, seemingly allowing data on a PSU to be manipulated by an arithmetical/logic operation (e.g., used as input or set by output) without first being copied to or from a processor register. However, in most of these systems, these instructions are actually implemented by a yet deeper, more fundamental layer of instructions—called the microcode—which divides the given instruction into several smaller, more fundamental microinstructions. The collections of microinstructions then perform the process just described above, i.e., input data is first retrieved and placed into a processor register before that data is used by the CPU. This means that the microcode instructions retrieves any input data—that is on the PSU and not currently in a processor register—from the PSU and places the retrieved input data into a processor register before performing the arithmetic/logic operation using that input. Similarly, this also means that the microcode instruction first places any output data resulting from performing the arithmetic/logic operation on a processor register before performing memory operations using that output.

Thus, at a high-level overview (of the basic Von Neumann architecture), the CPU of the data storage sub-system typically interacts with the PSU of the memory storage sub-system in a pattern of (1) retrieve instruction→(2) perform instruction→(3) retrieve instruction→(4) perform instruction→ . . . . In almost every case, the CPU retrieving its next instruction involves retrieving (data representing) the instruction from the PSU. Additionally, if the instruction retrieved is a memory operation, then the CPU will also interact with the PSU (e.g., to retrieve data from the PSU or to store/modify data on the PSU). Thus, the CPU constantly interacts with the PSU, both to determine its next operation (i.e., retrieve its next instruction) and, in many cases, to perform that operation.

Given the frequency with which the CPU interacts with the PSU (and, in general, the frequency with which the data processing sub-system interacts with the data-storage subsystem), reducing or ameliorating the effects of the Von Neuman bottleneck or memory wall—e.g., the tendency of the PSU to have insufficient speed compared to the CPU—is central consideration for the overall computer system's performance. Toward this goal, modern-day computer systems employ various strategies to reduce or mitigate the performance difference between the data processing subsystem and the data storage sub-system. One of the oldest and most basic strategies employed is to optimize the PSU to help reduce the speed disparity. It is for this reason that a PSU is usually optimized to have high speed and low latency.

One of the oldest and most basic strategies employed is to heavily optimize the main component of most data storage sub-systems—the PSU—to have high speed and low latency. While this helps reduce the performance gap between the data processing sub-system—or its main component, the CPU—and the data storage sub-system, having the PSU optimized for high speed results in various tradeoffs. For example, PSUs typically possess low storage density (e.g., low amount of data stored for each unit of volume) and typically possess high storage cost (e.g., high amount of cost for each unit of data storage). Most importantly, however, is that the optimization for high speed and low latency results in most PSUs being volatile, meaning that PSUs do not retain data if power is lost.

In a technical sense, having non-volatile storage is not strictly necessary for a computer system. Given some way to externally load the necessary data—e.g., a program to be executed—and some way to retrieve any desired output—e.g., the result of that program—only a means to store and retain data during execution is needed for a computer system to function. This functionality is exactly what a PSU provides. This is analogous to human "working memory," which is the neurological system responsible for retaining/remembering information for tasks currently being worked on. However, while not strictly necessary, most modern-day computer system find the ability to store data on a long-term basis beneficial.

Thus, because possessing non-volatile storage is usually beneficial, most data storage sub-systems also employ an additional component known as a secondary storage unit (SSU). Much like a PSU is analogous to human "working memory," an SSU is analogous to human "long-term memory," which is the neurological system responsible for retaining/remembering memories and information not currently being used, usually on a long-term (and potentially permanent) basis. Given its role in the data storage subsystem, unlike a PSU, an SSU is usually optimized for high storage capacity and long-term data retention, including non-volatility. As a consequence, however, an SSU is often slower than a PSU, both in terms of bandwidth (the amount of data able to be transferred over a time interval) and in terms of latency (the time taken to being responding to an I/O request).

Thus, in most computer systems, the data storage subsystem has both a PSU and an SSU, with the PSU serving as a high-speed repository for data relevant to the process/task being carried out by the CPU (or other data processing element of the data processing sub-system) and the SSU serving as a slower-speed repository for data and information not currently relevant to any ongoing process/tasks being executed. However, because the SSUs reduced performance (e.g., slower speed and higher latency) creates an even larger speed differential between the SSU and the CPU (or other data processing element), most computer systems do not transfer data directly from an SSU to the data processing sub-system.

While a direct exchange between a CPU and SSU is not theoretically impossible, most computer systems are architected so that, for a CPU (or other element of the data processing sub-system) to access data stored on an SSU, the data on the SSU must be first transferred to a PSU before then transferring that data to the data processing sub-system. As may be apparent, the reason for this data storage hierarchy is to avoid the data processing sub-system (e.g., a CPU) from spending, and wasting, a large number of its computing time (e.g., clock cycles) idling while data is retrieved from an SSU. Instead, the data is first read to the PSU while the data processing sub-system handles other tasks. Sometime after the transfer to the PSU is accomplished, the data processing sub-system may then retrieve the data (and handle the associated task) from the much faster PSU, avoiding a large waste in computing time.

Figure 4:
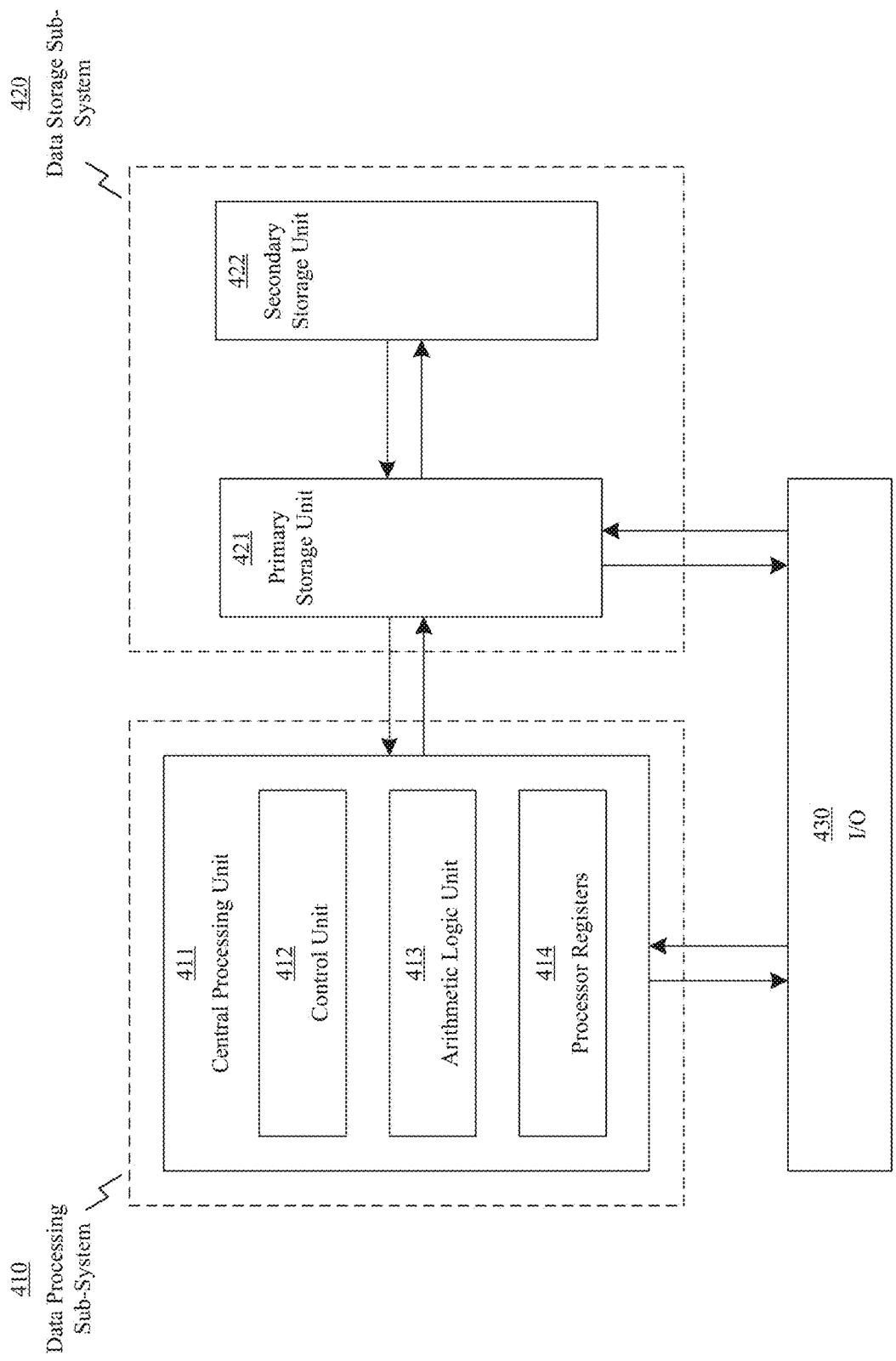
FIG. 4 is a simplified diagram illustrating a Von Neumann architecture variant.

FIG. 4 is a simplified diagram illustrating the Von Neumann architecture variant as just described. According to FIG. 4, the architecture is composed of a data processing sub-system 410 and a data storage sub-system 420. As shown by the figure data processing sub-system 410 is composed of only one data processing element—central processing unit 411. In contrast, data storage sub-system 420 is also composed of two data storage elements—primary storage unit 421 and secondary storage unit 422. Also present is I/O 430, which can provide input and output to CPU 411 and primary storage unit 421. Also shown in FIG. 4, are some of the internal components of CPU 411, including control unit 412, arithmetic logic unit 413, and processor registers 414. Also illustrated are the connections between central processing unit 411 and primary storage unit 421. As shown by these connections, data may be transferred between central processing unit 411 and primary storage unit 421. In a similar manner, the connections between primary storage unit 421 and secondary storage unit 422 are shown.

Of course, modern-day computer systems employ multiple additional strategies to ameliorate the Von Neumann bottleneck beyond merely optimizing the speed of the PSU. In many cases, the strategies simultaneously also deal with other issues imposed on the computer system physical constraints. This is notable because, in dealing with these other constraints, sometimes tradeoffs against further ameliorating the Von Neumann bottleneck are made.

One of these additional complexities on real-life computer systems is the inclusion of an operating system (OS). An operating system may be thought of as the "central" or "master" program that manages a computer system's hardware and various low-level operations. At a high level, one of the chief benefits of an operating system is that an operating system allows other programs/applications to safely ignore (i.e., abstracts away) the various underlying details of the computer system (and of other applications that are potentially running concurrently). As part of this abstraction, the operating system typically manages the operation of the data storage sub-system, a task that is known as "memory management." One of the most useful and widespread aspects of memory management employed by operating systems is the use of "paged virtual memory."

Figure 5:
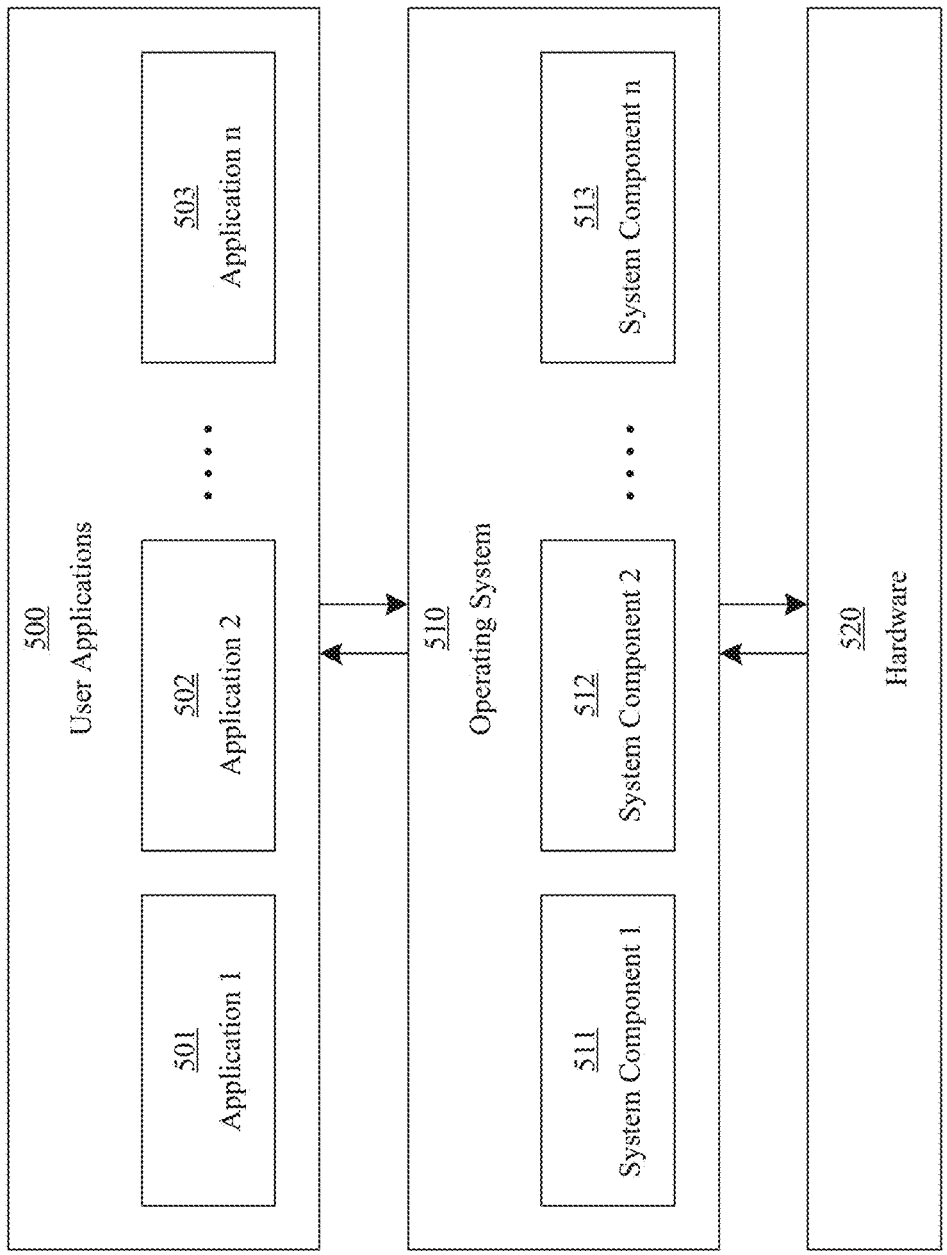
FIG. 5 is a simplified diagram illustrating the structure of an operating system.

FIG. 5 is a simplified diagram illustrating the structure of an operating system as just described. According to FIG. 5, a computer system may be composed of various hardware 520, which can have operating system 510 executing thereon. Operating system 510 may have various system components—shown here as system components 511, 512, and 513—which provide various functionality. An example of such a system component is memory management. Running on top of the OS are user applications 500, shown here as applications 501, 502, and 503. User applications 500 may take advantage of the various features and services offered by operating system 510 through system components to 511, 512, and 513 to interface with hardware 520 in a simplified manner.

As background, most modern-day computer systems provide the ability to allow multiple programs to be executed concurrently. This feature is usually implemented by the OS, where, instead of being called concurrent execution, it is more typically called multitasking. Multitasking can be achieved by interleaving the execution of various programs, allowing each a certain amount of time to operate. This process is called "time-sharing." Multitasking can also be achieved by utilizing a CPU (or other data processing element) with multiple cores by allowing different programs to be executed on different cores. In either scenario, allowing multiple programs to simultaneously be mid-execution creates potential conflicts regarding their memory usage. Specifically, as mentioned above, a program uses various memory addresses (and the memory locations the represent) to store its data. A conflict can arise, however, when two programs attempt to use the same physical address space. Such a conflict is particularly likely, in fact, because most programs use the address space starting at 0x00000000 up to the total amount of memory used by the application. This can lead to programs overwriting or otherwise altering one another's data. Beyond data corruption, this often leads to erroneous results (e.g., if the altered value is used as input for other operations), and, usually, failure of the program whose data was altered (e.g., a crash).

Paged virtual memory addresses these problems by acting as a means for the OS to transparently (to the programs) coordinate the memory being used by any programs being executed. This essentially abstracts away the details of coordinating memory usage (from the program's perspective), allowing a program to be written without concern for what other programs it may be ran concurrently with. In particular, paged virtual memory is a combination of two related memory management techniques: paged memory and virtual memory.

In a computer system utilizing virtual memory, the OS assigns to each program a virtual address space. From the perspective of the program, the "virtual address space" is the same as a "physical address space." However, because each program is assigned its own virtual address space, the program can freely use any virtual memory address without concern for the memory usage of any other concurrently executed programs. To actually implement each program's virtual address space, the OS can assign a (sufficiently sized) portion of the physical address space and create a data structure that records a mapping between a program's virtual memory addresses and a corresponding physical memory address from the assigned physical address space. This data structure can then be used to map the program's virtual addresses to their corresponding physical addresses. By ensuring that portions of the physical address space are mapped only to one program's virtual address space, the OS can ensure that no two programs attempt to use the same physical address, avoiding the memory coordination problem of concurrently executing multiple programs. Virtual addressing is usually given hardware assistance by the CPU through its memory management unit (MMU). The MMU primary performs translation of virtual memory addresses to physical addresses, speeding up the process.

But "virtual memory" suffers from several inefficiencies. First, without some kind of memory segmentation scheme (like paging), the physical address space assigned to a programs virtual address space must be contiguous. This leads to problems of memory fragmentation, reducing the effective amount of available memory on a PSU. Second, in some versions of virtual memory, each program being executed must have a physical address space assigned until the program has finished being executed. Given the limited capacity of a PSU, this can quickly exhaust the available amount of a PSU's memory, leaving insufficient memory to execute additional programs. Paging is a segmentation scheme that can be applied to virtual memory to avoid this first problem. Paging also naturally lends itself to yet another variant called demand paging, which helps resolve the second problem.

In particular, paging—or paged virtual memory—involves dividing each program's virtual memory into equal sized segments, called pages (or, sometimes, "virtual pages"), with the typical size being 4 kb. The system's physical memory is similarly divided into equal sized blocks, called page frames (or, sometimes, "physical pages"). For efficiency, the size of a page frame is typically the same size as a page (though, occasionally, the page frame size is smaller or larger by some power of 2). Then, rather than mapping a program's entire virtual address space to some (contiguous) physical address space, each page of a program's virtual memory is mapped to a page frame of physical memory. The OS maintains a data structure known as a page table that records what physical frame each page is mapped to. While this version of paging avoids the fragmentation problem of having to map a program's virtual memory to a contiguous segment of physical memory, it doesn't resolve the problem of having to map all of a program's virtual memory to physical memory, regardless of whether all of the program's virtual memory is currently being used. However, a variant of paging known as demand paging, does resolve this problem.

Figure 6:
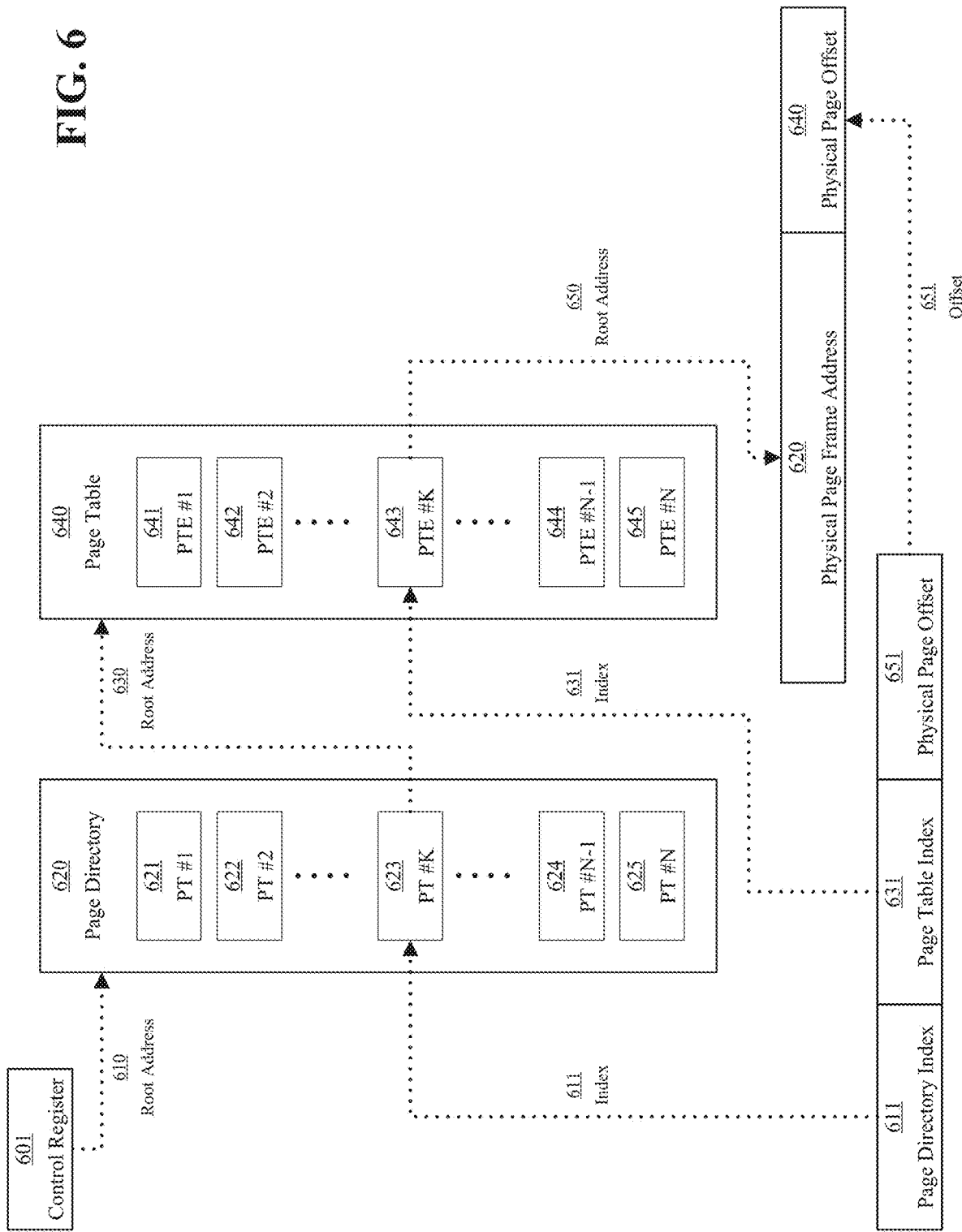
FIG. 6 is a diagram illustrating how virtual addresses are mapped to physical addresses in a virtual paging system utilizing page tables.

FIG. 6 is a diagram illustrating how virtual addresses are mapped to physical addresses in a virtual paging system utilizing page tables. In particular, FIG. 6 shows a two-level page table that maps virtual addresses to physical addresses. To start, in every page table system, control register 601 contains the physical address of the beginning of the highest-level table. In a two-level page table scheme, the highest-level table is the page directory. Every entry in a page directory is the physical address of the beginning of a page table, which is the next (and lowest level) table. Every entry in a page table is the address to a physical frame that actually stores the desired data. In operation, a virtual address (the combination of page directory index 611, page table index 631, and physical page offset 651) in a two-level page table scheme is divided into three components: The first component (directory index 611) is an index for the appropriate page table in page directory 620 and the second component (page table index 631) is an index for the appropriate physical frame address in page table 640. The third component is simply the offset into the physical frame and is not mapped. Rather, the third component is appended to the physical frame address to determine the complete physical address that the virtual address maps to.

Demand paging is essentially the same as paging/paged virtual memory, except that demand paging exploits the existence of the SSU. In demand paging, only some of a program's pages are assigned to (backed by/stored on) a page frame, usually the ones that are in active use. For the pages not backed by a page frame, the unbacked pages are instead stored (swapped out) to the SSU. The portion of the SSU used for this purpose is typically called the swap space. This allows the OS/computer system to assign more virtual memory than could fit on the physical memory at one time, because the OS can freely swap out which page is being backed by a page frame at any given time. By analogy, one can think of pages stored on an SSU as being somewhat analogous to the concept of a human's "intermediate-term memory." Typically, an SSU is used to store data for long-term retention, without most of the data not being presently used at any given time. This is analogous to a human's "long-term memory." The portion of the SSU used for the swap space, however, is usually not intended for long-term retention. Rather, data stored in the swap space is data that is in presently being used, but, only in the intermediate future (e.g., minutes), rather than at the literal present moment or short-term future (e.g., seconds). This is analogous to human short intermediate-term memory, which stores information that, while relevant to the current task, is not being used for the actions being performed at the exact literal moment.

Because demand paging involves having some pages stored on the PSU while having other pages stored on the SSU, the OS should have some method of determining which pages should be on the PSU and which should be on the SSU. There is the initial questions of—at the start of an application—what pages should be brought to the PSU at initialization. Thereafter, while the application is running, there is the two separate but interrelated questions of when to transfer additional pages from the SSU to the PSU (page in) and when to transfer (if ever) pages from the PSU back to the SSU (page out).

Since a page usually must reside in the PSU for its instructions to be executed by the CPU (or its data to be accessed), a program (at the start of its execution) must have at least one page in the PSU. Thereafter, at a minimum, new pages may be paged in as the new pages are referenced. More precisely, a reference to a page (more precisely, whenever a virtual address on a page) that is not currently paged in (e.g., is currently swapped out to the SSU) is referenced/accessed is referred to as a page fault. Whenever a page fault occurs, the OS intervenes to page in the referenced page (i.e., load the referenced page onto the PSU from the SSU). Variants of demand paging may also choose to load other, non-referenced pages (called prefetching) or may load pages without the occurrence of a page fault. Almost every OS also does the inverse operation, i.e., paging out a page currently paged in (e.g., currently loaded onto the PSU) to the swap space in the SSU. The criteria used to determine which page is selected to be paged out is referred to as the page-replacement algorithm, with various algorithms using various criteria. While paging out is not theoretically required, the problem that demand paging was introduced to solve—ensuring that free space remains in the PSU—could reoccur (e.g., all available physical memory—every page frame—could eventually be in use). This could lead to memory running out, which could cause problems if a program attempts to access a page that was currently paged out.

The basic variant of demand paging is "pure demand paging," which only ever pages in a page upon the occurrent of a page fault. While this does resolve the problem of having a limited amount of physical memory available on a PSU, purge demand paging introduces another problem by compounding the effect of the memory bottleneck. Specifically, since a page is only ever loaded in when a page fault occurs, whenever a page is first accessed, the OS usually intervenes to load the referenced page onto the SSU. Since pages are relatively small, this is likely to happen very frequently. This is problematic, however, because of the vast speed disparity between the SSU and data-processing sub-system elements, such as the CPU. When a page fault occurs, the CPU usually has to wait a significant amount of time (relative the time taken per clock cycle) for the relevant page to be retrieved from the SSU onto a (just mapped) page frame in the PSU. To help reduce the occurrence of page faults, many OS's utilize a variant demand paging known as anticipatory paging (as opposed to pure demand paging).

In anticipatory paging, as suggested by its name, the OS attempts to predict what pages a process will soon access or reference (i.e., the OS attempts to predict what virtual memory addresses the process will attempt to interact with in the near-term future) and then preloads—e.g., prefetches—the pages predicted to be soon accessed before the access occurs so that, by the time the access occurs, the page has already been mapped to a page frame and had its data loaded onto the corresponding memory locations of the PSU. Unfortunately, however, it is impossible to always perfectly know in advance what page (or, more specifically, what virtual addresses) a process will attempt to reference (at least, not without running a complete simulation of the program, which would be redundant). Therefore, every implementation of anticipatory paging uses heuristics to guess what pages (more specifically, what virtual addresses) will be referenced in the near future, and then preloading those pages (more specifically, the pages containing the virtual addresses). Heuristics are similarly used by page replacement algorithms to guess what pages will not be referenced in the near future, and then paging out those pages.

The heuristics used by many variants of anticipatory paging are based on locality of reference. Locality of reference refers to the tendency of (a particular instruction in) a program to repetitively refer to nearby memory locations over a short time span. This, in turn, means that a reference to (a virtual address of) one page indicates that references to (virtual addresses of) nearby pages are likely. This can be exploited in anticipatory paging schemes by, upon occurrence of a page fault, paging in the pages neighboring the page-fault-triggering page's neighboring pages (if the neighboring pages are paged out) along with the page-fault triggering page, since the neighbors are also likely to be accessed in the near future. Usually, these functions are also given hardware support by a CPU's MMU.

While the paged virtual memory systems just described help ameliorate some of the performance reductions caused Von Neumann bottleneck, many, if not most, of the performance reductions still persist. For this reason, most modern-day computer systems employ an additional strategy to further reduce the performance penalty: caching. More specifically, virtually all modern day components of the data processing sub-system, particularly the CPU, employ internal memory known as hardware caches. A hardware cache functions much like a higher tier of memory above the PSU but below the internal processor registers. More specifically, a hardware cache is typically faster than the PSU (like the PSU is faster than the SSU), but also smaller, in terms of storage capacity, than the PSU (like the PSU has less storage capacity than the SSU). A hardware cache functions in many ways like the PSU, except that a hardware cache only stores copies of data on the PSU for convenience. In other words, a cache is used to hold copies of frequently accessed data, so that the data can be accessed faster than the data could be retrieved from the PSU. If the data is modified, the data may be retained in the cache (if the data is still being used and or modified) before being written back to the PSU (so that, in effect, the cache holds the current copy of the data).

The interaction between a hardware cache and PSU is also similar to the interaction between a PSU and SSU in that the CPU (or other data element) containing the hardware cache determines what data to retain in the hardware cache and also determines what retained data to remove (or write back, if change were made that are intended to be but have not yet been written to the PSU). This is largely analogous to the memory management functions performed by the operating system when deciding what pages to page in to the PSU and what pages to page out to the SSU. The criteria that determines when data is retrieved into the cache or evicted from the cache is called the cache algorithm. This situation is somewhat complicated by the fact that most modern CPUs (and most other modern data processing elements) have several layers of hardware caches (called multi-level caches), which forms a cache hierarchy. The hardware caches are typically labeled L1, L2, etc., with L1 being the hardware cache located closest to the processor register (i.e., located at the top of the cache hierarchy), L2 being the next closest, and so on. Multi-caches follow the same general trend of the memory hierarchy in that hardware caches closer to the processor registers (e.g., the L1 cache) are faster, but have smaller storage capacity while hardware caches closer to the PSU are slower but have a larger storage capacity. Data moves between different cache layers in much the same way as data is moved between the outermost cache and the PSU. Where hardware caches and PSUs differ, however, is that, rather than the OS being in charge of paging in and paging out data, the CPU (or other data storage element) is in charge of moving data (and determining what data to move) between the PSU and last-level cache or between the various levels of caches.

As mentioned earlier, most modern-day computer systems utilize a modified version of the basic Von-Neumann architecture. Rather than the data processing sub-system being composed of only the CPU, most modern-day computers also utilize other data processing elements. These other data processing elements, called accelerators, are more specialized than the CPU. Accelerators, unlike CPUs, utilize a specialized architecture that is more efficient (e.g., greater serial speed, more parallelism, less energy usage) for the particular tasks the accelerator is designed for. That is where the term "accelerator" comes from; an accelerator speeds up (i.e., accelerates) the workload or workloads the accelerator is designed for. As a cost for this speedup on one set of tasks, however, accelerators tend to do worse on other sets of tasks. One common example of such an accelerator is a GPU, which is faster than a CPU on tasks that require processing numerous simple operations, such as often occurs in machine learning applications.

Figure 7:
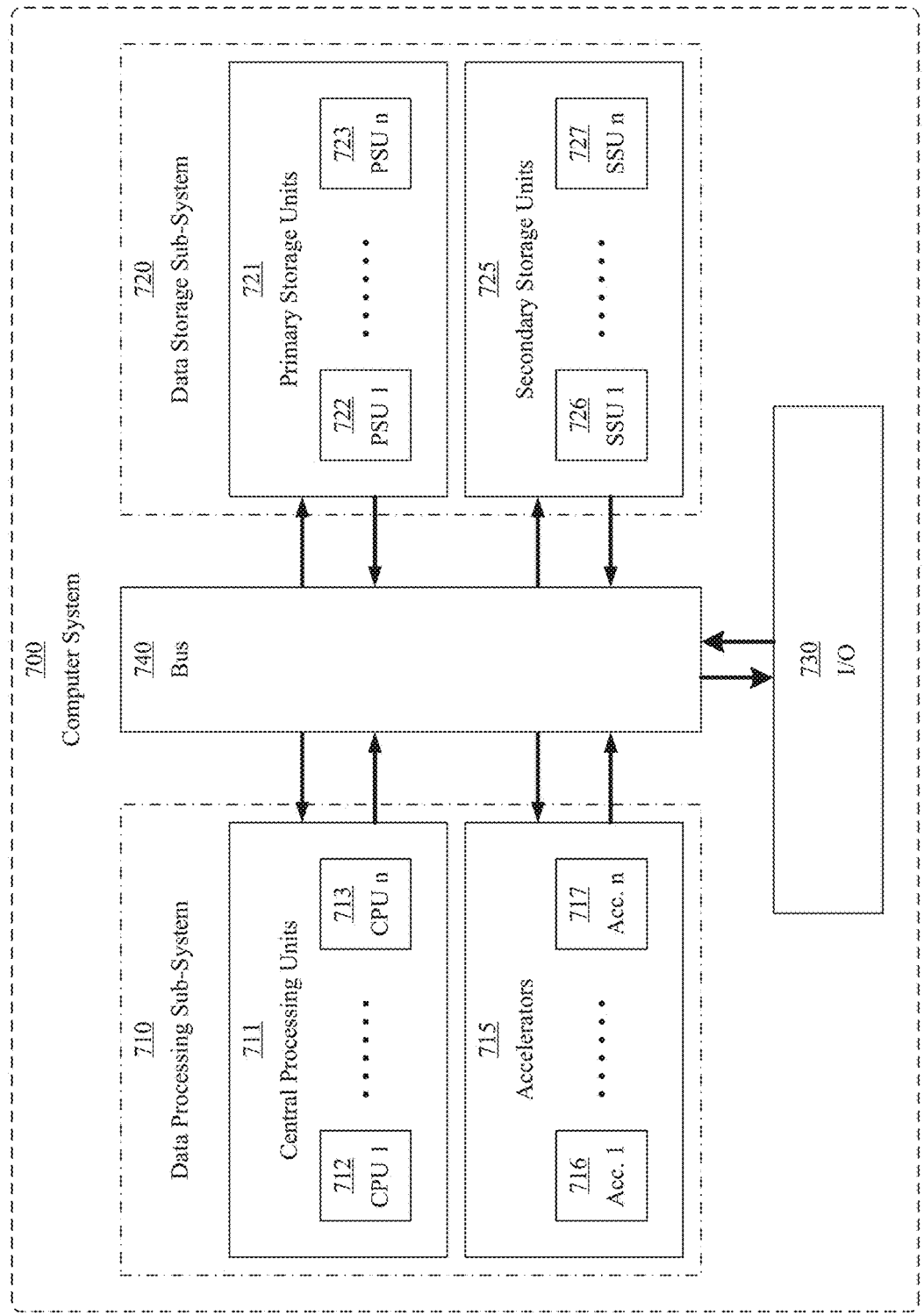
FIG. 7 is a simplified diagram illustrating the modified Von Neumann architecture employed by many modern-day computer systems.

FIG. 7 is a simplified diagram illustrating the modified Von Neumann architecture employed by many modern-day computer systems. According to FIG. 7, the architecture is composed of a data processing sub-system 710 and a data storage sub-system 720. As shown by the figure data processing sub-system 710 is composed of various data processing elements, including central processing units 711 and accelerators 715. As shown by the figure, data processing sub-system 710 may have multiple central processing units—shown here as CPUs 712 and 713—and multiple accelerators—shown here as accelerators 716 and 717. Similarly, data storage sub-system 420 is also composed of various data storage elements, including primary storage units 721 and secondary storage units 725. As shown by the figure, data storage sub-system 720 may have multiple primary storage units—shown here as primary storage units (PSUs) 722 and 723—and multiple secondary storage units—shown here as secondary storage units (SSUs) 726 and 727. Also shown is bus 740, which connects data processing sub-system 710 and data storage sub-system 720. Bus 740 may also connect the internal components of data processing sub-system 710 and data storage sub-system 720 together. Additionally, bus 740 may connection data processing sub-system 710 and data storage sub-system 720 to I/O 730, which can provide input and output to these sub-systems.

Figure 8:
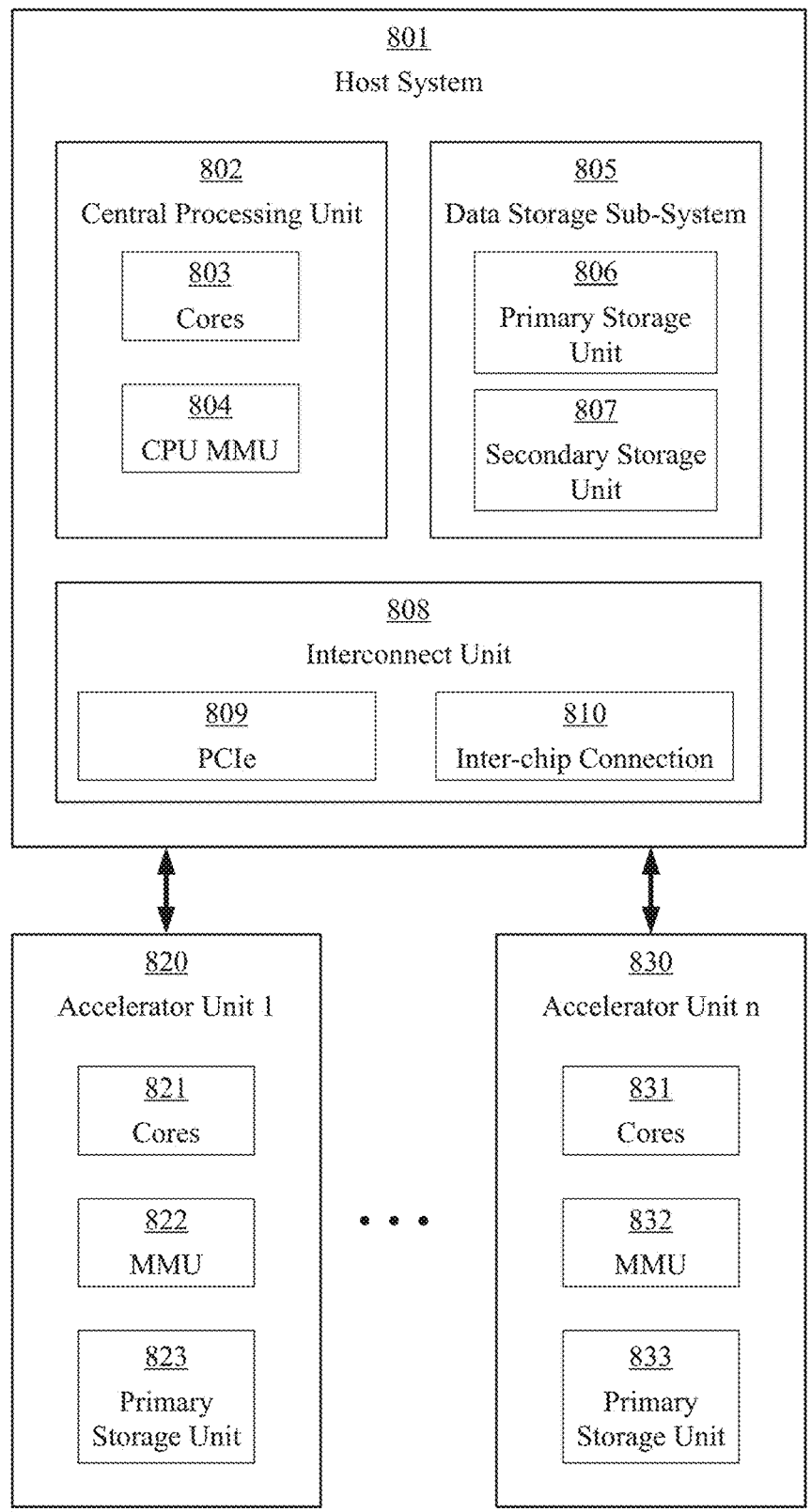
FIG. 8 is a simplified diagram also illustrating the architecture employed by many modern-day computer systems.

FIG. 8 is a simplified diagram also illustrating the architecture employed by many modern-day computer systems, particular heterogenous computer systems. According to FIG. 8, host system 801 may comprise a central processing unit 802, interconnect unit 808, and data storage sub-system 805. Central processing unit 802 may contain cores 803 and CPU MMU 804. Similarly, data storage sub-system 805 may contain primary storage unit 806 and secondary storage unit 807. CPU 802 may communicate with data storage sub-system 805 (and ultimately, may communicate with primary storage unit 806 and secondary storage unit 807) through interconnect unit 808. Host system 801 may also be connected to a plurality of accelerator units—shown here as accelerator units 820 and 830—through interconnect unit 807. Also shown by FIG. 8 is that an accelerator unit, such as accelerator 820, is comprised of cores (such as cores 821), an MMU (such as MMU 822), and a primary storage unit (such as primary storage unit 813).

Despite this difference, however, accelerators do share one particular relevant similarity with CPUs; accelerators still fetch instructions to be executed and data to be used from a PSU. In some computer systems, an accelerator may fetch instructions and data from a PSU into internal hardware caches in much the same was as a CPU does. This system introduces complications, however, as complex systems usually must be used to ensure data coherency. In other words, additional systems are used to ensure that an accelerator does not access data on a PSU that is being modified by another data processing element (e.g., a CPU or other accelerator), since this can result in race conditions or the use of stale and invalid data. Additionally, having accelerators share the PSU with the CPU can result in competition between the accelerator and CPU for storage space, possibly reducing the performance of the system.

As an alternative approach, in some computer systems, an accelerator may have its own internal PSU that is dedicated solely to the accelerator's use. In this approach, for the accelerator to fetch instructions or data, the instructions are first copied over from central PSU to the accelerator's PSU. In other words, an additional step is added, with the accelerator's internal PSU treating the central PSU in a similar manner the how the CPU treats the SSU. Note that, at this level of complexity, some systems may have scenarios where the accelerator can directly retrieve data from the central PSU or directly transfer data from an SSU onto its internal PSU. While this solves some of the issues identified above for a shared central PSU, giving an accelerator its own internal CPU introduces another inefficiency. Namely, in a basic implementation, the internal PSU for an accelerator is not transparent. Rather, the accelerator's internal PSU is exposed to programs using the accelerator, who must account for its use. Combined with the fact that the virtual memory addresses for a program running on the GPU are not coordinated with the virtual addresses for the same program running on the CPU, this means that zero copy operations are not possible.

To address this limitation, some computer systems employ systems to implement a unified memory, such as a heterogenous system architecture. This allows the virtual memory used on both the central PSU and on the accelerator's internal PSU to be coordinated, so that pointers may be freely shared between programs running on the accelerator and between programs running on the CPU (or other accelerator using the central PSU). In other words, unified memory allows a CPU and accelerator (e.g., GPU) to use the same virtual memory space (for a given program).

However, when using a system with unified memory, such as a heterogenous system architecture, for reasons of coherency, pages that are utilized by an accelerator may still have to be transferred to the accelerator's PSU. However, just like with the system PSU, an accelerator's PSU has limited space. Thus, pages are moved between the accelerator's PSU and the system PSU in much the same way that pages are moved between the system PSU and the SSU. This should be managed carefully, however, to avoid issues such as page thrashing. In many cases, the data on an accelerator's PSU is managed by—e.g., the memory management function for the accelerator's PSU is performed by—either the accelerator's MMU, a driver for the accelerator running on the host system/OS, or a cooperation between these two elements.

Figure 9:
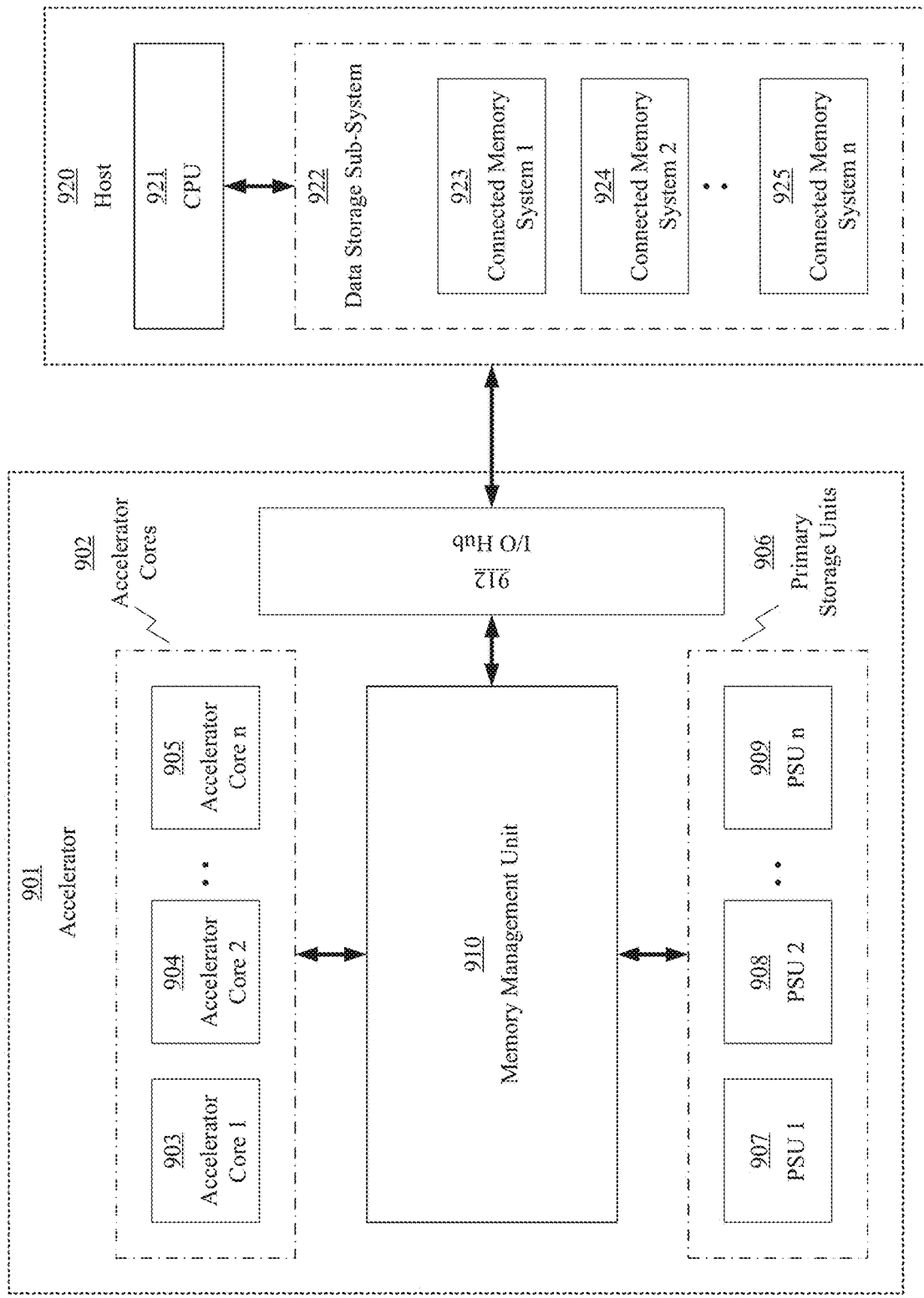
FIG. 9 is a simplified diagram illustrating an accelerator.

FIG. 9 is a simplified diagram illustrating an accelerator as just described. As depicted in FIG. 9, computer system 900 may consist of a host 920 which is connected to an accelerator 901. Host 920 may contain a CPU 921 and a data storage sub-system 922. Data storage sub-system 922 may consist of a plurality of connected memory systems, shown here as connected memory systems 923, 924, and 925. In general, connected memory systems 923, 924, and 925 could be a variety of memory storage devices, such as DRAM (e.g., a primary storage unit), an SSD (e.g., an secondary storage unit), an HDD, a magnetic tape disk, or the like. Additionally, CPU 921 is connected to and may exchange data with data storage sub-system 922. With regards to accelerator 901, according to FIG. 9, accelerator 901 comprises accelerator cores 902, primary storage units 906, memory management unit 910, and I/O hub 912. As shown by the figure, accelerator cores 902 may contain a plurality of accelerator cores, shown here as accelerator cores 903, 904, and 905. Similarly, primary storage units 906 may contain a plurality of primary storage units, shown here as primary storage units 907, 908, and 909. Also, memory management unit 910 is connected to accelerator cores 902, primary storage unit 906, and I/O hub 912. I/O hub 912 itself is connected to host 920.

A key part of the memory management for an accelerator is prefetching pages to avoid unnecessary page faults, since retrieving pages from the system's CPU often takes a significant amount of time. However, previous methods of prefetching are inefficient. For example, sequential prefetching involves prefetching fixed amounts of pages of data, which often leads to too little data being prefetched and results in many unnecessary page faults.

To address the issue of effectively and efficiently prefetching data onto the primary storage of an accelerator using unified virtual memory in heterogenous computer systems, some embodiments of the present disclosure may begin by detecting an attempt to access a first page of data that is not currently stored on the primary storage unit of the accelerator. In some embodiments, detecting an attempt to access a page of data not currently stored on the accelerator's PSU could comprise detecting a page fault. The page fault may be the result of a kernel being executed on the accelerator attempting to reference a virtual memory address that is currently not stored on the accelerator's PSU. For example, the page the virtual memory address corresponds to may be stored on the host system's PSU or may be paged out to the host system's SSU. In some embodiments, detecting an attempt to access a first page of data not currently stored on the PSU may be the result of a prediction that a kernel being executed on the accelerator is likely to access the page in the near future. For example, if the kernel has been accessing contiguous pages in a mostly sequential order, then it could be predicted that the kernel will attempt to access a page that is slightly further in the order and that is not yet loaded into the accelerator's PSU.

Figure 11:
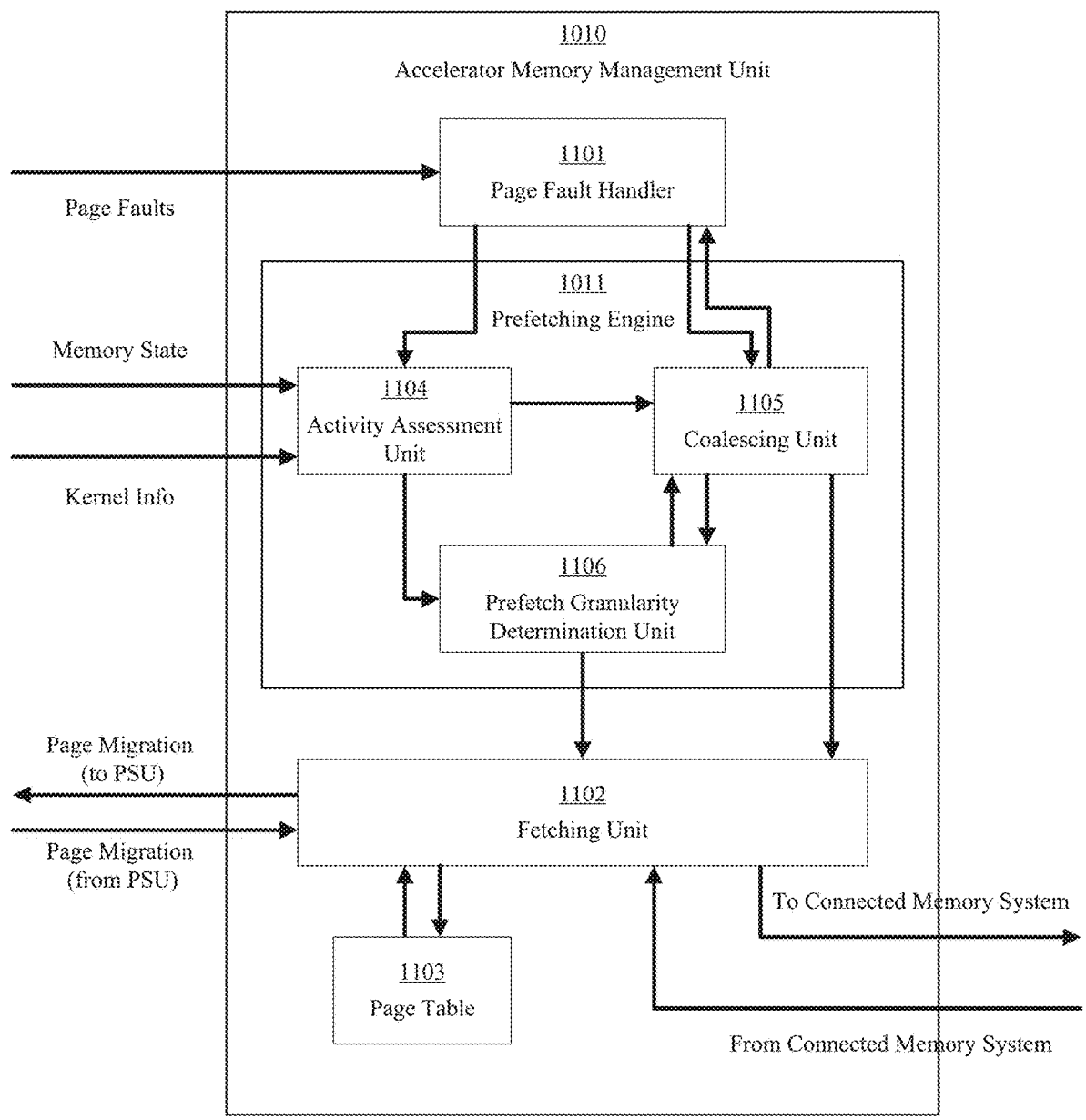
FIG. 11 is a simplified diagram illustrating a memory management unit (MMU) of an accelerator, according to some embodiments of the present disclosure.
Figure 17:
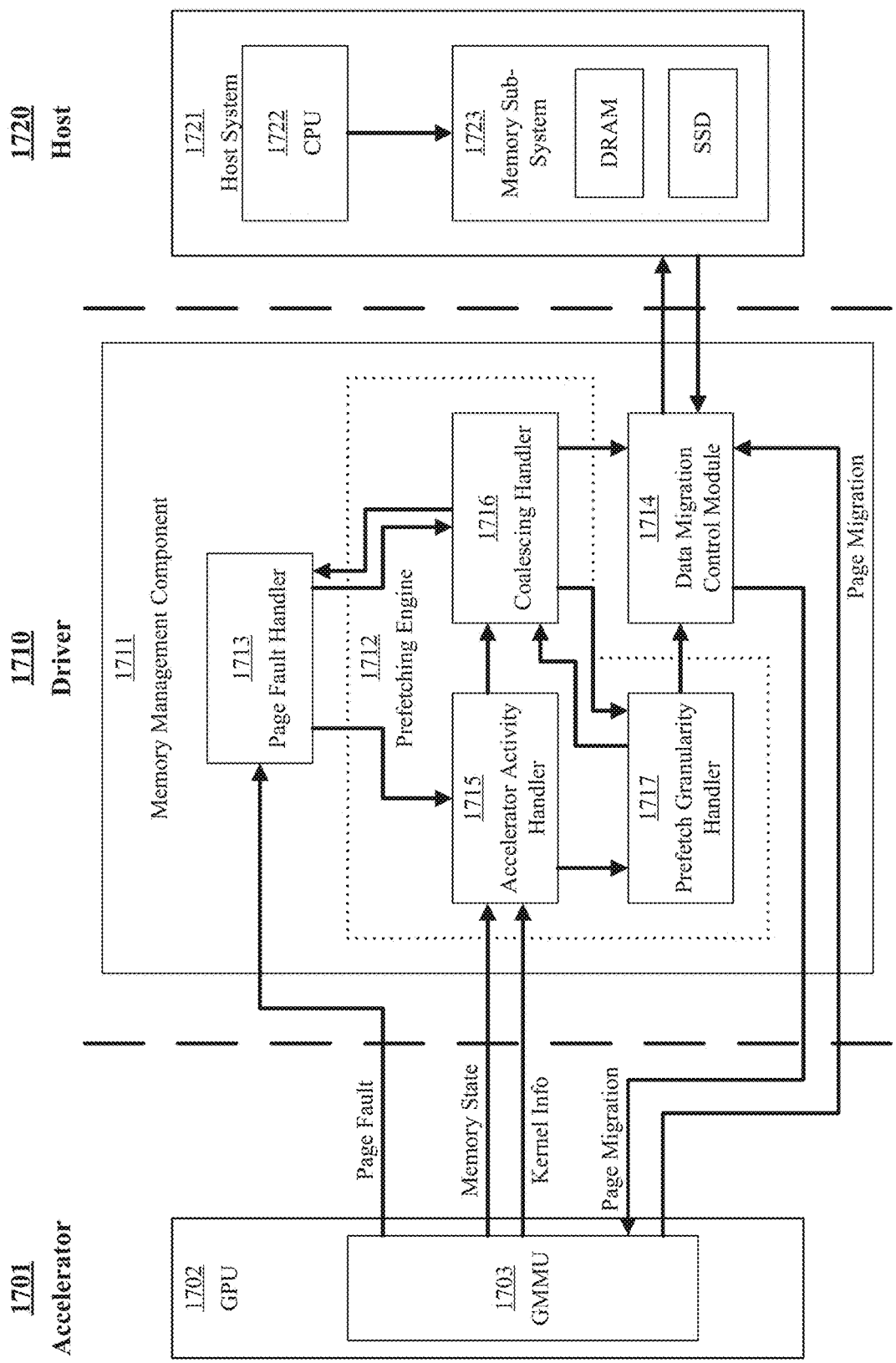
FIG. 17 is a simplified diagram illustrating how the lease duration of a fetched page may be decided and set by a host system, according to some embodiments of the present disclosure.

After detecting an attempt to access the first page of data that is currently stored on the accelerator's PSU, some embodiments may—in response to the detection of the attempt—assess the activity of the accelerator (e.g., by activity assessment unit 1104 of FIG. 11 or by accelerator activity handler 1715 of FIG. 17). In some embodiments, the activity of the accelerator could include the activity of kernels being executed on the accelerator. This kernel activity could include more general kernel activity, such as how many kernels are being currently run, the amount of memory being used by the kernels, the amount of memory being used by the kernels that has been referenced/accessed, and the like. The activity of the accelerator could also include specific kernel activity—e.g., the activity of specific kernels or groups of kernels—such as the length of time the kernel has been run, the amount of memory being used by the kernel, the amount of memory being used by the kernel that has actually been referenced/accessed, the kernel's memory access patterns (e.g., the pages referenced/accessed and the relationship between them), and the like. The activity of the accelerator could also include recent or historical kernel activity—both general and specific. For example, some embodiments may consider the recent x number of seconds of the activity to assess an average or determine a trend in the activity of the executed kernels generally or in the activity of a specific kernel or group of kernels. The activity of the accelerator could also include predicted future kernel activity—either for kernel activity generally or specifically for a particular kernel or group of kernels.

Additionally, in some embodiments, the activity of the accelerator could include the usage of the primary storage unit of the accelerator. In some embodiments, the usage of the primary storage unit could include more general usage, such as the overall amount of pages (of data) stored, the overall amount of free/unused space remaining, the overall memory access patterns to the pages stored in the primary storage unit, the relative layout of these memory accesses, and the like. The activity of the accelerator could also include more specific usage, such as the overall amount of pages stored for a particular kernel, the overall pattern of memory accesses to these pages by a particular kernel, the duration a page or group of page has remained in the primary storage unit, the amount of times a page or group of pages has been referenced/accessed, the amount of times since a page or group of pages has last been referenced/accessed, whether the page or group of pages is frequently used by a different processor (e.g., a CPU of the host system), whether a particular page exhibits signs of thrashing, and the like. The activity of the accelerator could also include recent or historical usage of the primary storage unit—both general and specific. For example, some embodiments may consider the recent x number of seconds of the usage of the primary storage unit to assess an average or determine a trend in the usage of the primary storage unit, either generally, on the usage of specific pages or groups of pages belonging to specific kernels, or on the usage of a page of group of pages. The activity of the accelerator could also include predicted usage of the primary storage unit—either for usage generally or on the basis of a specific pages.

Additionally, in some embodiments, the activity of the accelerator could include additional information relating to the accelerator, such as the amount of pending kernels (e.g., kernels queued for execution but not yet executed), the nature of the pending kernels, the current temperature of the accelerator, the remaining headroom between the current temperature and maximum operating temperature, current power usage of the accelerator, and the like. The activity of the accelerator could also include recent or historical information regarding this additional information relating to the accelerator. For example, some embodiments may consider the recent x number of seconds of data regarding this additional information to assess an average or determine a trend in the usage of the primary storage unit. The activity of the accelerator could also include predicted future data regarding this additional information.

After assessing the activity of the accelerator, some embodiments may determine a prefetch granularity size (e.g., by prefetch granularity determination unit 1106 of FIG. 11 or by prefetch granularity handler 1717 of FIG. 17). In some embodiments, the prefetch granularity size may directly indicate the amount of pages to be prefetched along with the first page of data. For example, in some embodiments, the prefetch granularity size could indicate that the number of pages to be fetched, including the first page of data, is sixteen pages. Additionally, in some embodiments, the prefetch granularity size may indirectly indicate the amount of pages to be prefetched along with the first page of data. For example, in some embodiments, pages may be of a fixed size (e.g., 4 KiB) and these prefetch granularity size may indicate the total amount of pages worth of data—including the first page of data—that is to be retrieved (e.g., 256 KiB). For instance, in this example, the total number of pages to be retrieved would be sixty-four, since 256 KiB/4 KiB=64.

In some embodiments, the prefetch granularity size may be based on the assessed activity of the accelerator. In some embodiments, the prefetch granularity size could also be based on characteristics of the first page of data and the surrounding contiguous pages of data that various prefetch granularity sizes would result in being fetched or prefetched. For example, in some embodiments the prefetch granularity size could be partly based the number of times (if any) the pages have previously been fetched or evicted, and the like. Additionally, in some embodiments, the prefetch granularity size chosen may be based on a fetching strategy. The fetching strategy may include the criteria/algorithm by which an optimal number of pages to be fetch/prefetched is determined, possibly along with heuristics used to evaluate (or estimate) the characteristics of the page or group of pages that differing prefetch granularity sizes would result in being fetched.

In some embodiments, after the prefetch granularity size has been determined, a prefetch granularity sized chunk of contiguous pages that contain the first page of data may be transferred (e.g., by fetching unit 1102 of FIG. 11 or by data migration control module 1714 of FIG. 17) from a memory system connected to the accelerator into the accelerator's PSU. In some embodiments, this may involve retrieving data from the primary storage unit being used by a CPU of the host system the accelerator is connected to (e.g., from data storage sub-system 1022 of FIG. 10 or from memory sub-system 1723 of FIG. 17). In some embodiments, this may involve retrieving data from the primary storage unit of other accelerators connected to the same system. Also, in some embodiments this may involve retrieving data directly from a secondary storage unit attached to the system.

Figure 10:
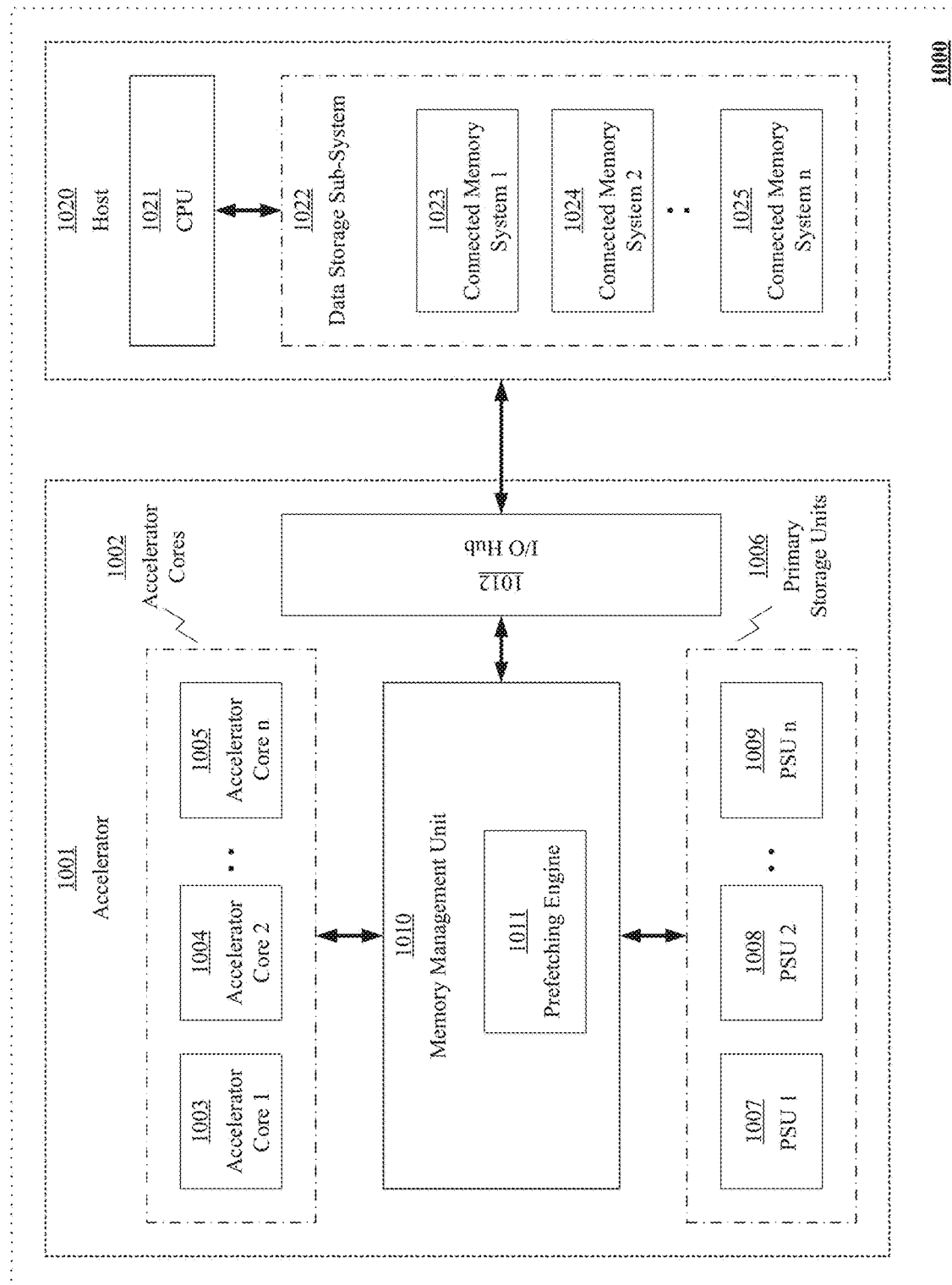
FIG. 10 is a depiction of an example computer system for employing a method for managing the primary unit of an accelerator, according to some embodiments of the present disclosure.

FIG. 10 is a depiction of an example computer system 1000 for employing a method for managing the primary storage unit of an accelerator, according to some embodiments of the present disclosure. Although depicted generically, system 1000 may be implemented on any computer, such as a server, such as a desktop computer, a laptop computer, a tablet, or the like, configured to execute, for example, the method described in FIG. 11 below. As depicted in FIG. 10, computer system 1000 may consist of a host 1020 which is connected to an accelerator 1001. Host 1020 may contain a CPU 1021 and a data storage sub-system 1022. Data storage sub-system 1022 may include a plurality of connected memory systems, shown here as connected memory systems 1023, 1024, and 1025. In general, connected memory systems 1023, 1024, and 1025 could be a variety of memory storage devices, such as DRAM (e.g., a primary storage unit), an SSD (e.g., a secondary storage unit), an HDD, a magnetic tape disk, or the like. Additionally, CPU 1021 is connected to and may exchange data with data storage sub-system 1022.

With regards to accelerator 1001, according to FIG. 10, accelerator 1001 comprises accelerator cores 1002, primary storage units 1006, memory management unit 1010, and I/O hub 1012. As shown by the figure, accelerator cores 1002 may contain a plurality of accelerator cores, shown here as accelerator cores 1003, 1004, and 1005. Similarly, primary storage units 1006 may contain a plurality of primary storage units, shown here as primary storage units 1007, 1008, and 1009. Additionally, memory management unit 1010 also possesses a prefetching engine 1011 that could, for example, implement the method described in FIG. 12. Also, memory management unit 1010 is connected to accelerator cores 1002, primary storage unit 1006, and I/O hub 1012. I/O hub 1012 itself is connected to host 1020.

FIG. 11 is a simplified diagram illustrating a memory management unit (MMU) of an accelerator, according to some embodiments of the present disclosure. According to FIG. 11, memory management unit 1010 (from FIG. 10) may have a page fault handler 1101, a fetching unit 1102, a page table 1103, and a prefetching engine 1011 (from FIG. 10). Prefetching engine 1001 itself may have an activity assessment unit 1104, a coalescing unit 1105, and a prefetch granularity determination unit 1106. As shown by the incoming arrows, accelerator memory management unit 1010 may receive a page fault. Upon receiving the page fault, page fault handler 1101 respond by preparing to fetch the page referenced in the page fault. Page fault handler 1101 may do so immediately or it may wait a certain amount of time before proceeding. In any event, once page fault handler 1101 begins to respond to the page fault, it may prompt activity assessment unit 1104 to assess the activity of the accelerator based on the accelerator's memory stage and the kernel info (e.g., the information about the processes running on the accelerator).

Based on the activity assessment of activity assessment unit 1104 and the pages requested in the page fault, prefetch granularity determination unit 1106 may determine a prefetch granularity size. Fetching unit 1102 may then retrieve a prefetch granularity-sized chunk of pages that contains the first page of data referenced in the page fault. In some embodiments, the prefetch granularity-sized chunk of pages may be byte aligned to the prefetch granularity size (e.g., if the prefetch granularity size is 64 KiB, then the chunk of pages is 64 KiB-byte aligned). Upon retrieving the prefetch granularity-sized chunk of pages of data, fetching unit 1102 may create an entry for them in page table 1103. Fetching unit 1102 may then store the retrieved pages in the accelerator's primary storage unit (e.g., one of primary storage units 1006 of FIG. 10, such as PSU 1007).

Additionally, after page fault handler 1101 receives the first page fault, but before prefetch granularity determination unit 1106 determines a prefetch granularity size, page fault handler 1101 may receive a second page fault referencing a second page of data. In this event, page fault handler may prompt coalescing unit 1105 to determine if the page faults will be combined into one retrieval operation. Based on the activity assessment of activity assessment unit 1104 and the pages requested in the page faults, coalescing unit 1105 may determine whether the first page of data referenced in the first page fault and the second page of data referenced in the second page fault should be retrieved as one contagious chunk of pages of data. To this end, coalescing unit 1105 may cooperate with prefetch granularity determination unit 1106 to determine whether to set the prefetch granularity size such that the chunk of contiguous pages includes both the first page of data and the second page of data. If prefetch granularity determination unit 1106—with input from coalescing unit 1105—sets the prefetch granularity size such that the chunk of contiguous pages includes both the first page of data and the second page of data, then coalescing unit 1105 will coalesce the retrieval of the first page of data and the second page of data into one retrieval operation. Otherwise, coalescing unit 1105 may report to page fault handler 1101 that the second page fault will not be coalesced with the first page fault, which may prompt page fault handler 1101 to respond to the second page fault on its own (e.g., in the same manner the first page fault was handled).

In general, prefetching engine 1011 may be comprised of hardware, software, or a combination of hardware and software. For example, fetching unit 1102 may be implemented by circuitry on the GPU that receives memory addresses and then uses the memory addresses to retrieve pages from a connected memory system and store them on the accelerator's PSU. Similarly, in some embodiments, accelerator memory management unit 1010 may have circuitry that handles the initial receipt of a page fault from a kernel running on the accelerator (shown here as page fault handler 1101). This circuitry may in turn trigger a page fault handling routine. The page fault handling routine may be firmware on the GPU that the circuitry triggers to begin executing on the GPU (in a manner analogous to how a page fault exception from an application on a CPU triggers a context switch to kernel mode and the execution of the kernel's page fault handler). This page fault handler routine may then implement activity assessment unit 1104 by assessing the activity of the accelerator by reviewing the memory state (e.g., the contents of the accelerator's PSU). The page fault handler may also implement prefetch granularity determination unit 1106 by using the activity assessment and the page referenced in the first page fault to determine what prefetch granularity size (e.g., what pages, if any, to prefetch). The page fault handler may then implement leasing unit 1105 by using the assessed activity and the page referenced in the second page fault to determine if the prefetch granularity size will be such that the chunk of contiguous pages includes both the first page of data and the second page of data.

However, in some embodiments, activity assessment unit 1104—or portions of activity assessment unit 1104—may instead be implemented in hardware as circuitry. For example, accelerator memory management unit 1010 could have circuitry dedicated to monitoring the pages accessed or referenced by the kernel being executed on the accelerator. This information could be stored in a buffer inside accelerator memory management unit 1010. Then, when a page fault occurs, the page fault handler could trigger a firmware routine that uses the information stored in the buffer, possibly alongside an analysis of the current state and use of the accelerator's PSU, to come up with a more complete activity assessment. In a similar manner, prefetch granularity determination unit 1106 may utilize a firmware to select a prefetch granularity size, but then use dedicated circuitry to handle translating this prefetch granularity size in pages retrieved from the connected memory system. Also, portions of fetching unit 1102 may be implemented as firmware. For example, dedicated circuitry within fetching unit 1102 may perform retrieval operations but could invoke firmware to update page table 1103.

Figure 12:
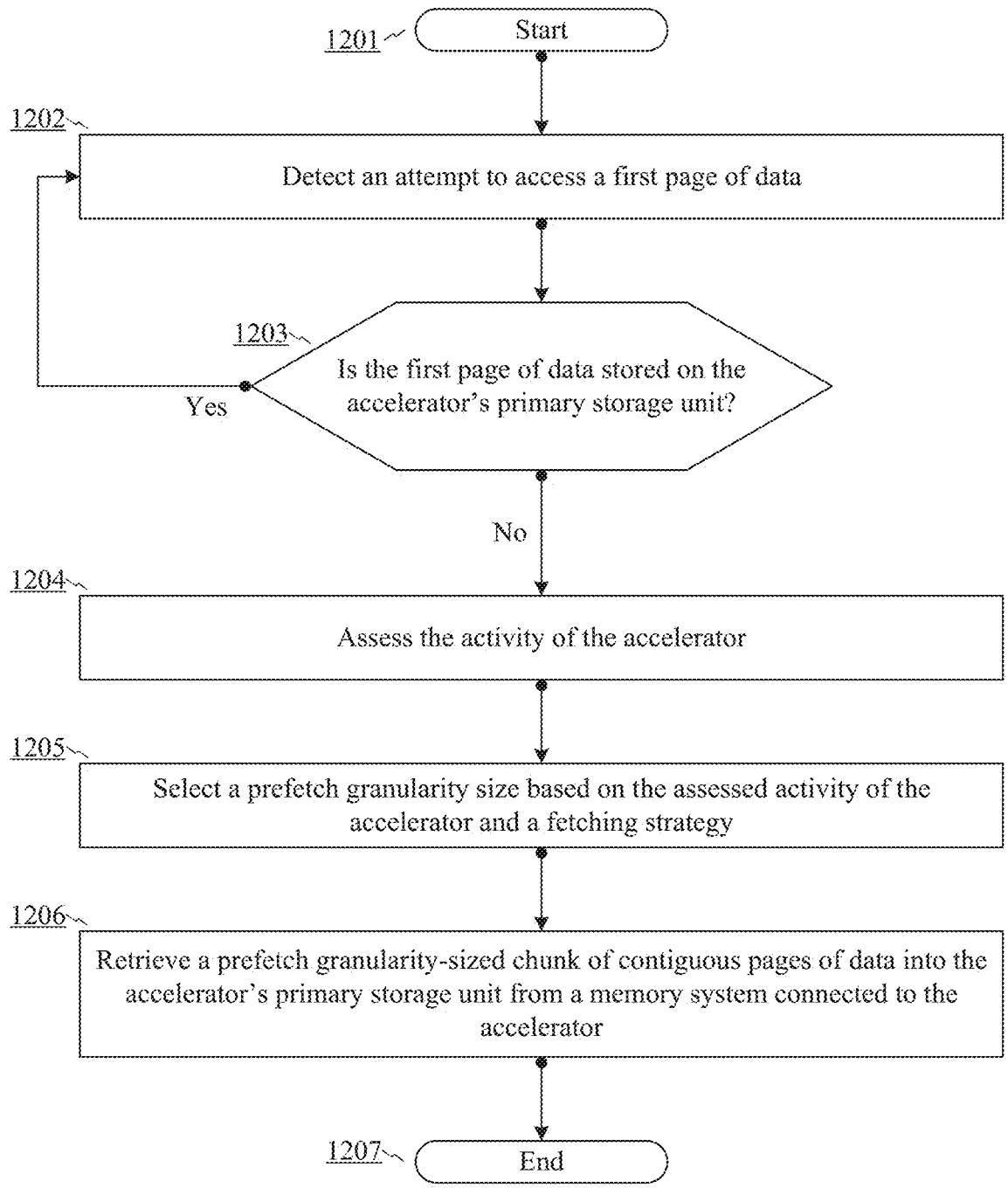
FIG. 12 is a flowchart of an exemplary method for managing a primary storage unit of an accelerator, according to some embodiments of the present disclosure.

FIG. 12 is a flowchart of an exemplary method for fetching data for an accelerator, according to some embodiments of the present disclosure. As shown by FIG. 12, in step 1202, an attempt to access a first page of data is detected. For example, accelerator memory management unit 1010 could detect an instruction by a kernel running on the accelerator referencing a particular virtual memory address. Next, in step 1203, it is determined if the first page of data is stored on the accelerator's primary storage unit. This may be performed, for example, by memory management unit 1010, which may consult the triggering kernel's page table to determine if the page containing the referenced virtual memory address is assigned a corresponding physical address in the accelerator's primary storage unit. If the first page of data is stored on the accelerator's primary storage unit, the method returns to step 1202. On the other hand, if the first page of data is not stored on the accelerator's primary storage unit, then the method proceeds to step 1204.

In step 1204, the activity of the accelerator is assessed. For example, activity assessment unit 1104 of prefetching engine 1011 may review the current memory state of the accelerator. This may involve, in some embodiments, analyzing the current amount of the accelerator's PSU that is in use, the access patterns for those pages, and the like. Then, in step 1205, a prefetch granularity size is selected. For example, prefetch granularity determination unit 1106 may, based on the first page of data and the assessed activity, select a certain amount of pages worth of data to be retrieved (e.g., 64 KiB). This may involve, in some embodiments, multiplying the accelerator's primary storage unit's page size by a multiple of 2. In general, the prefetch granularity size may be selected based on the activity of the accelerator assessed in step 1204 and a fetching strategy.

After step 1205, in step 1206, a prefetch granularity-sized chunk of contiguous pages of data is retrieved from a memory system connected to the accelerator into the accelerator's primary storage unit. This may involve, for example, fetching unit 1102 accessing the connected memory system (e.g., connected memory system 1022 of FIG. 10) to copy the page of data from the connected memory system to a buffer or to the accelerator's PSU. After step 1206, the method may end.

Figure 13:
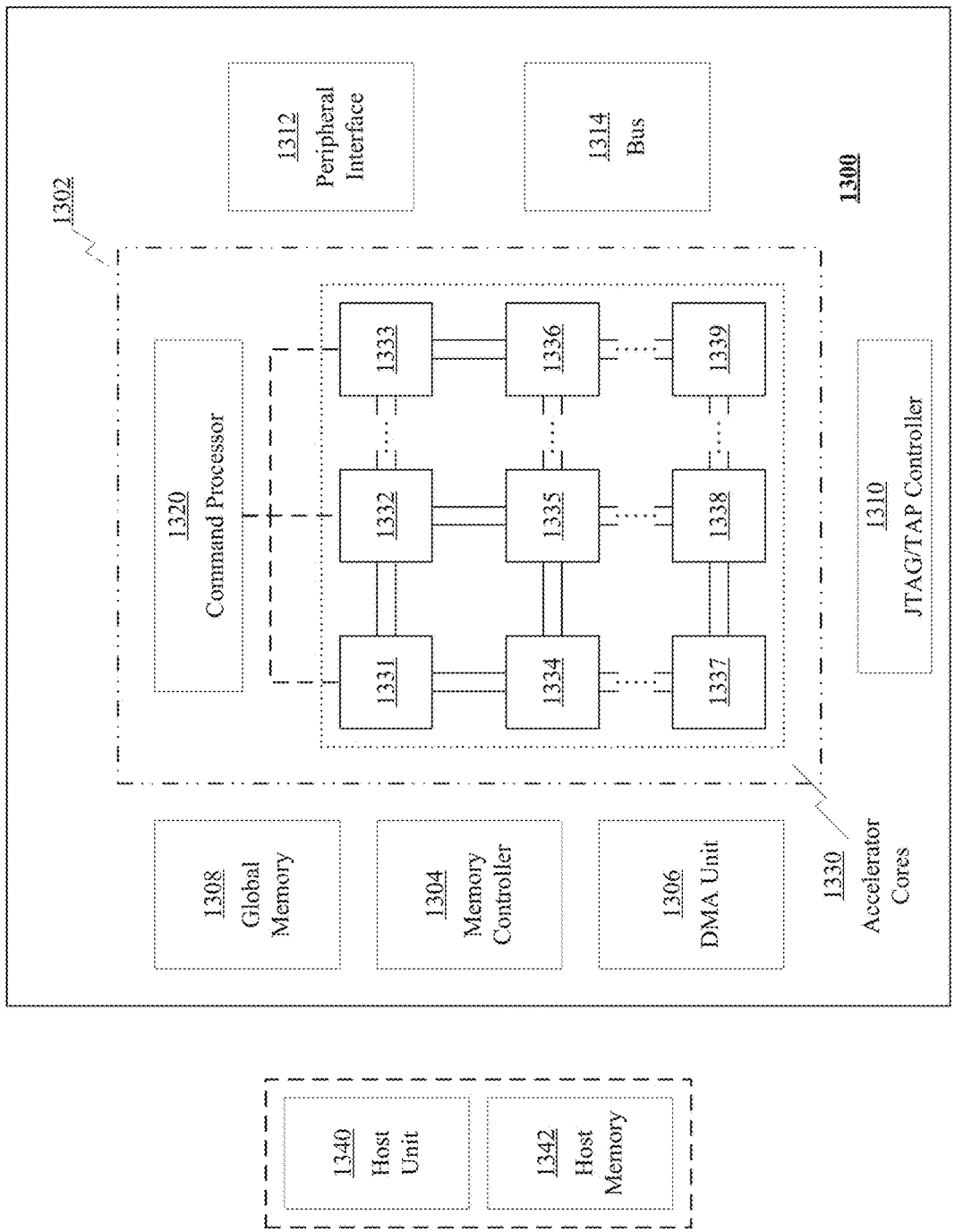
FIG. 13 is a schematic diagram illustrating a more detailed view of the architecture an exemplary accelerator, according to some embodiments of the present disclosure.

FIG. 13 is a schematic diagram illustrating a more detailed view of the architecture an exemplary accelerator, according to some embodiments of the present disclosure. Specifically, FIG. 13 illustrates a neural network processing architecture 1300, which could be an accelerator unit for an artificial neural network, an FPGA, an ASIC, or a variety of other types of accelerators. As shown by FIG. 13, accelerator unit 1300 can include an accelerator processing system 1302, a memory controller 1304, a direct memory access (DMA) unit 1306, a global memory 1308, a Joint Test Action Group (JTAG)/Test Access End (TAP) controller 1310, a peripheral interface 1312, a bus 1314, and the like. It is appreciated that, accelerator processing system 1302 can perform algorithmic operations (e.g., machine learning operations) based on communicated data.

Accelerator processing system 1302 can include a command processor 1320 and a plurality of accelerator cores 1330. Command processor 1320 may act to control and coordinate one or more accelerator cores, shown here as accelerator cores 1331, 1332, 1333, 1334, 1335, 1336, 1337, 1338, and 1339. Each of the accelerator cores 1330 may provide a subset of the synapse/neuron circuitry for parallel computation (e.g., the artificial neural network). For example, the first layer of accelerator cores 1330 of FIG. 13 may provide circuitry representing an input layer to an artificial neural network, while the second layer of accelerator cores 1330 may provide circuitry representing a hidden layer of the artificial neural network. In some embodiments, accelerator processing system 1302 can be implemented as one or more GPUs, NPUs, TPUs, FPGAs, ASICs, or other heterogeneous accelerator units.

Accelerator cores 1330, for example, can include one or more processing elements that each include single instruction, multiple data (SIMD) architecture including one or more processing units configured to perform one or more operations (e.g., multiplication, addition, multiply-accumulate, etc.) based on instructions received from command processor 1320. To perform the operation on the communicated data packets, accelerator cores 1330 can include one or more processing elements for processing information in the data packets. Each processing element may comprise any number of processing units. In some embodiments, accelerator cores 1330 can be considered a tile or the like. In some embodiments, the plurality of accelerator cores 1330 can be communicatively coupled with each other. For example, the plurality of accelerator cores 1330 can be connected with a single directional ring bus, which supports efficient pipelining for large neural network models. The architecture of accelerator cores 1330 will be explained in detail with respect to FIG. 13.

Accelerator processing architecture 1300 can also communicate with a host unit 1340. Host unit 1340 can be one or more processing unit (e.g., an X86 central processing unit). As shown in FIG. 13, host unit 1340 may be associated with host memory 1342. In some embodiments, host memory 1342 may be an internal memory or an external memory associated with host unit 1340. In some embodiments, host memory 1340 may comprise a host disk, which is an external memory configured to provide additional memory for host unit 1340. Host memory 1342 can be a double data rate synchronous dynamic random-access memory (e.g., DDR SDRAM) or the like. Host memory 1342 can be configured to store a large amount of data with slower access speed, compared to the on-chip memory integrated within one or more processors, acting as a higher-level cache. The data stored in host memory 1342 may be transferred to accelerator processing architecture 1300 to be used for executing neural network models.

In some embodiments, a host system having host unit 1340 and host memory 1342 can comprise a compiler (not shown). The compiler is a program or computer software that transforms computer codes written in one programming language into NPU instructions to create an executable program. In machine learning applications, a compiler can perform a variety of operations, for example, pre-processing, lexical analysis, parsing, semantic analysis, conversion of input programs to an intermediate representation, code optimization, and code generation, or combinations thereof. For example, the compiler can compile a neural network to generate static parameters, e.g., connections among neurons and weights of the neurons.

In some embodiments, the host system 1340 may push one or more commands to accelerator processing system 1302. As discussed above, these commands can be further processed by command processor 1320 of accelerator processing system 1302, temporarily stored in an instruction buffer of accelerator processing architecture 1300, and distributed to one or more corresponding accelerator cores (e.g., accelerator cores 1331 and 1332) or processing elements. Some of the commands can instruct DMA unit 1306 to load the instructions (generated by the compiler) and data from host memory 1342 into global memory 1308. The loaded instructions may then be distributed to each accelerator core assigned with the corresponding task, and the one or more accelerator cores can process these instructions.

Figure 14:
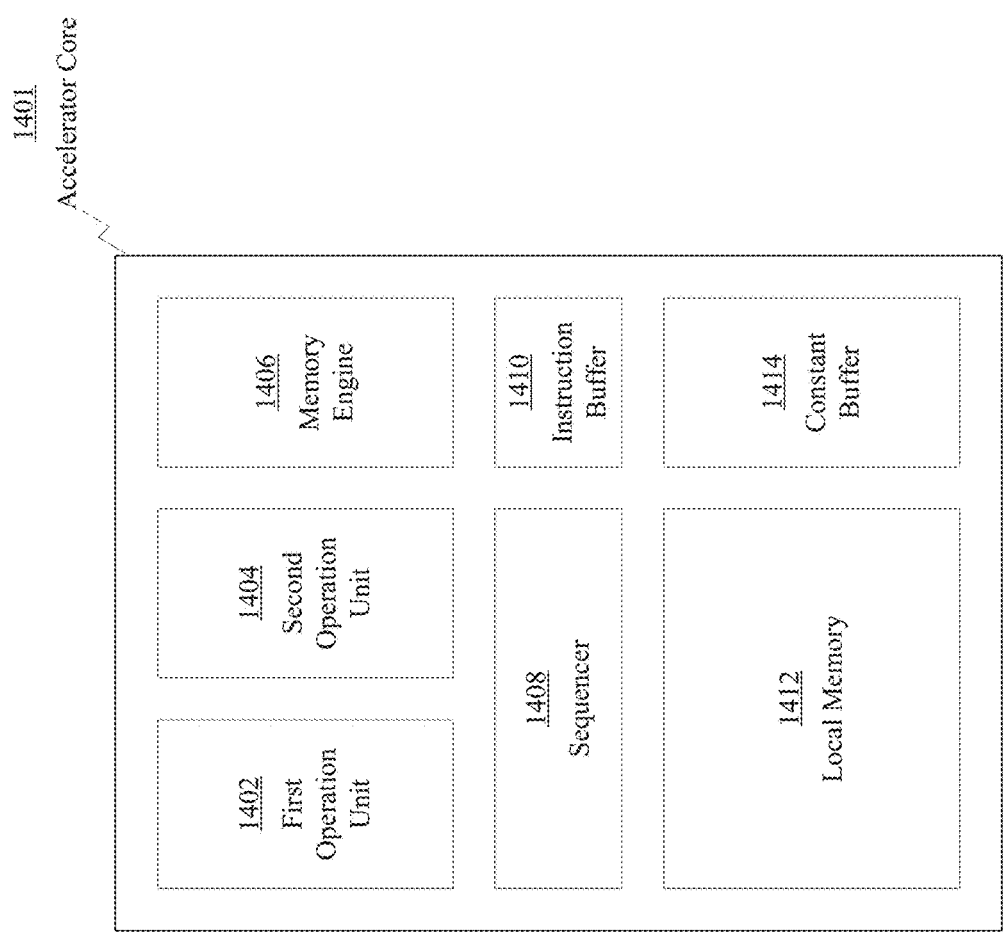
FIG. 14 illustrates an exemplary accelerator core architecture, according to some embodiments of the present disclosure.

It is appreciated that the first few instructions received by the accelerator cores 1330 may instruct the accelerator cores 1330 to load/store data from host memory 1342 into one or more local memories of the accelerator cores (e.g., local memory 1412 of FIG. 14). Each of the accelerator cores 1330 may then initiate the instruction pipeline, which involves fetching the instruction (e.g., via a sequencer) from the instruction buffer, decoding the instruction (e.g., via a DMA unit 1306), generating local memory addresses (e.g., corresponding to an operand), reading the source data, executing or loading/storing operations, and then writing back results.

Command processor 1320 can interact with the host unit 1340 and pass pertinent commands and data to accelerator processing system 1302. In some embodiments, command processor 1320 can interact with host unit 1340 under the supervision of kernel mode driver (KMD). In some embodiments, command processor 1320 can modify the pertinent commands to each accelerator core, so that accelerator cores 1330 can work in parallel as much as possible. The modified commands can be stored in an instruction buffer. In some embodiments, command processor 1320 can be configured to coordinate one or more accelerator cores for parallel execution.

Memory controller 1304, also referred to as a memory management unit, can manage the reading and writing of data to and from a specific memory block within global memory 1308 having on-chip memory blocks (e.g., blocks of second generation of high bandwidth memory (HBM2)) which serve as the primary storage unit/main memory for the accelerator. For example, memory controller 1304 can manage read/write data coming from outside accelerator processing system 1302 (e.g., from DMA unit 1306 or a DMA unit corresponding with another NPU) or from inside accelerator processing system 1302 (e.g., from a local memory in an accelerator core, such as accelerator core 1331, via a 2D mesh controlled command processor 1320). Moreover, while one memory controller is shown in FIG. 13, it is appreciated that more than one memory controller can be provided in accelerator unit 1300. For example, there can be one memory controller for each memory block (e.g., HBM2) within global memory 1308. In some embodiments, global memory 1308 can store instructions and data from host memory 1342 via DMA unit 1306. The instructions can then be distributed to an instruction buffer of each accelerator core assigned with the corresponding task, and the accelerator core can process these instructions accordingly.

Memory controller 1304 can generate memory addresses and initiate memory read or write cycles. Memory controller 1304 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers. Memory controller 1304 may also have a prefetching engine (not shown), such as prefetching engine 1011 in FIGS. 10 and 11. The prefetching engine in memory controller 1304 may control the amount of pages prefetched from host memory 1342.

DMA unit 1306 can assist with transferring data between host memory 1342 and global memory 1308. For example, DMA unit 1306 can assist with loading data or instructions from host memory 1342 into local memory of accelerator cores 1330. DMA unit 1306 can also assist with transferring data between multiple accelerators. In addition, DMA unit 1306 can assist with transferring data between multiple NPUs (e.g., accelerator processing system 1302 implemented on an NPU). For example, DMA unit 1306 can assist with transferring data between multiple accelerator cores 1330 or within each accelerator core. DMA unit 1306 can allow off-chip devices to access both on-chip and off-chip memory without causing a CPU interrupt. Thus, DMA unit 1306 can also generate memory addresses and initiate memory read or write cycles. DMA unit 1306 also can contain several hardware registers that can be written and read by the one or more processors, including a memory address register, a byte-count register, one or more control registers, and other types of registers. These registers can specify some combination of the source, the destination, the direction of the transfer (reading from the I/O device or writing to the I/O device), the size of the transfer unit, or the number of bytes to transfer in one burst. It is appreciated that accelerator unit 1300 can include a second DMA unit, which can be used to transfer data between other neural network processing architectures to allow multiple neural network processing architectures to communication directly without involving the host CPU.

JTAG/TAP controller 1310 can specify a dedicated debug port implementing a serial communications interface (e.g., a JTAG interface) for low-overhead access to the NPU without requiring direct external access to the system address and data buses. JTAG/TAP controller 1310 can also have on-chip test access interface (e.g., a TAP interface) that implements a protocol to access a set of test registers that present chip logic levels and device capabilities of various parts.

Peripheral interface 1312 (such as a peripheral component interconnect express (PCIe) interface), if present, serves as an (and typically the) inter-chip bus, providing communication between accelerator unit 1300 and other devices. Bus 1314 (such as a I$^2$C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the NPU with other devices, such as the off-chip memory or peripherals. For example, bus 1314 can provide high speed communication across accelerator cores and can also connect accelerator cores 1330 (via accelerator processing system 1302) with other units, such as the off-chip memory or peripherals. Typically, if there is a peripheral interface 1312 (e.g., the inter-chip bus), bus 1314 is solely concerned with intra-chip buses, though in some implementations it could still be concerned with specialized inter-bus communications.

Accelerator processing system 1302 can be configured to perform operations based on artificial neural networks. While accelerator processing architecture 1300 can be used for convolutional neural networks (CNNs) in some embodiments of the present disclosure, it is appreciated that accelerator processing architecture 1300 can be utilized in various neural networks, such as deep neural networks (DNNs), recurrent neural networks (RNNs), or the like. In addition, some embodiments can be configured for various processing architectures, such as CPUs, GPGPUs, GPUs, NPUs, TPUs, FPGAs, ASICs, any other types of heterogeneous accelerator processing units (HAPUs), or the like.

In operation, an artificial neural network, according to some embodiments of the present disclosure, may be transferred from host memory 1342 to the accelerator unit 1300 using the DMA unit 1306. The host unit 1340 may be connected to the accelerator unit 1300 via Peripheral interface 1312. In some embodiments, the artificial neural network and intermediate values of the artificial neural network may be stored in global memory 1308 which is controlled by memory controller 1304. Finally, artificial neural networks by be ran on the AI processor 1302, with command processor 1320 managing the processing of an input with an artificial neural network.

FIG. 14 illustrates an exemplary accelerator core architecture, according to some embodiments of the present disclosure. As shown in FIG. 14, accelerator core 1401 (e.g., accelerator cores 1330 of FIG. 13) can include one or more operation units such as first unit 1402 and second operation unit 1404, a memory engine 1406, a sequencer 1408, an instruction buffer 1410, a constant buffer 1414, a local memory 1412, or the like.

One or more operation units can include first operation unit 1402 and second operation unit 1404. First operation unit 1402 can be configured to perform operations on received data (e.g., matrices). In some embodiments, first operation unit 1402 can include one or more processing units configured to perform one or more operations (e.g., multiplication, addition, multiply-accumulate, element-wise operation, etc.). In some embodiments, first operation unit 1402 is configured to accelerate execution of convolution operations or matrix multiplication operations. Second operation unit 1404 can be configured to perform a pooling operation, an interpolation operation, a region-of-interest (ROI) operation, and the like. In some embodiments, second operation unit 1404 can include an interpolation unit, a pooling data path, and the like.

Memory engine 1406 can be configured to perform a data copy within a corresponding accelerator core 1401 or between two accelerator cores. DMA unit 1306 (from FIG. 13) can assist with copying data within a corresponding accelerator core 1401 or between two accelerator cores. For example, DMA unit 1306 can support memory engine 1406 to perform data copy from a local memory (e.g., local memory 1412 of FIG. 14) into a corresponding operation unit. Memory engine 1406 can also be configured to perform matrix transposition to make the matrix suitable to be used in the operation unit.

Sequencer 1408 can be coupled with instruction buffer 1410 and configured to retrieve commands and distribute the commands to components of accelerator core 1401. For example, sequencer 1408 can distribute convolution commands or multiplication commands to first operation unit 1402, distribute pooling commands to second operation unit 1404, or distribute data copy commands to memory engine 1406. Sequencer 1408 can also be configured to monitor execution of a neural network task and parallelize sub-tasks of the neural network task to improve efficiency of the execution. In some embodiments, first operation unit 1402, second operation unit 1404, and memory engine 1406 can run in parallel under control of sequencer 1408 according to instructions stored in instruction buffer 1410.

Instruction buffer 1410 can be configured to store instructions belonging to the corresponding accelerator core 1401. In some embodiments, instruction buffer 1410 is coupled with sequencer 1408 and provides instructions to the sequencer 1408. In some embodiments, instructions stored in instruction buffer 1410 can be transferred or modified by command processor 1320 (from FIG. 13). Constant buffer 1414 can be configured to store constant values. In some embodiments, constant values stored in constant buffer 1414 can be used by operation units such as first operation unit 1402 or second operation unit 1404 for batch normalization, quantization, de-quantization, or the like.

Local memory 1412 can provide storage space with fast read/write speed. To reduce possible interaction with a global memory, storage space of local memory 1412 can be implemented with large capacity. With the massive storage space, most of data access can be performed within accelerator core 1401 with reduced latency caused by data access. In some embodiments, to minimize data loading latency and energy consumption, static random-access memory (SRAM) integrated on chip can be used as local memory 1412. In some embodiments, local memory 1412 can have a capacity of 192 MB or above. According to some embodiments of the present disclosure, local memory 1412 be evenly distributed on chip to relieve dense wiring and heating issues.

Figure 15:
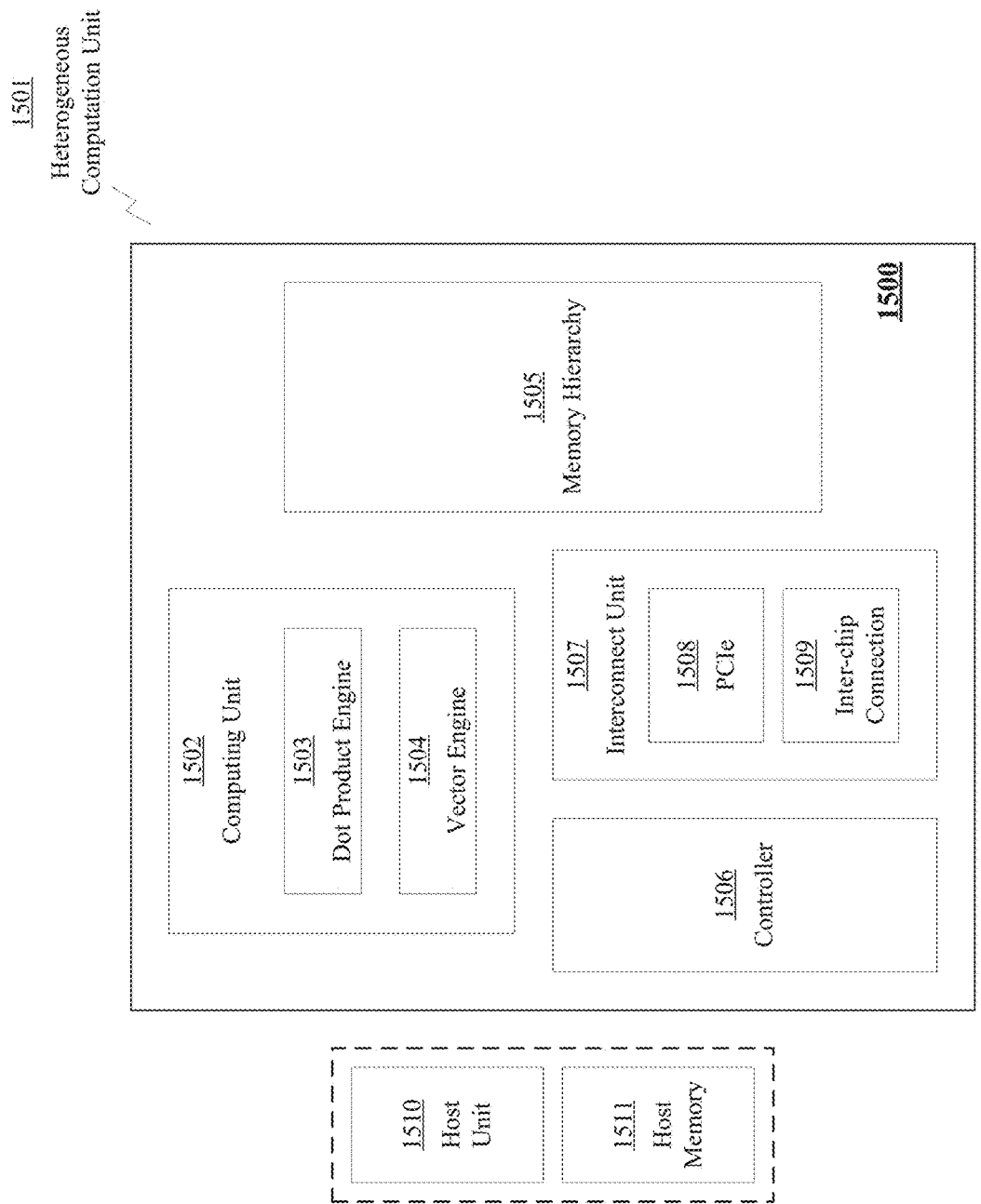
FIG. 15 is a schematic diagram illustrating an alternative architecture of an exemplary accelerator, according to some embodiments of the present disclosure.

FIG. 15 is a schematic diagram illustrating an alternative architecture of an exemplary accelerator as was illustrated in FIG. 13, according to some embodiments of the present disclosure. Like the exemplary accelerator architecture in FIG. 13, FIG. 15 illustrates an accelerator architecture 1500 that some embodiments of the present disclosure may be implemented on. In various embodiments, neural network processing architecture 1500 could be an accelerator unit for an artificial neural network, an FPGA, an ASIC, or a variety of other types of accelerators. As shown in FIG. 15, architecture 1500 can include a heterogeneous computation unit (HCU) 1501 and a corresponding host unit 1510 and host memory 1511, and the like. It is appreciated that, HCU 1501 can be a special-purpose computing device for facilitating neural network computing tasks. For example, HCU 1501 can perform algorithmic operations (e.g., machine learning operations) based on communicated data. HCU 1501 can be an accelerator, such as a GPU, an NPU, a TPU, an FPGA, an ASIC, or the like.

HCU 1501 can include one or more computing units 1502, a memory hierarchy 1505, a controller 1506 and an interconnect unit 1507. Each computing unit 1502 can read data from and write data into memory hierarchy 1505, and perform algorithmic operations (e.g., multiplication, addition, multiply-accumulate, etc.) on the data. In some embodiments, computing unit 1502 can include a plurality of engines for performing different operations. For example, as shown in FIG. 15, computing unit 1502 can include a dot product engine 1503, a vector engine 1504, and the like. Dot product engine 1503 can perform dot product operations such as multiplication and convolution. Vector engine 1504 can perform vector operations such as addition.

Memory hierarchy 1505 can have on-chip memory blocks (e.g., 4 blocks of HBM2) to serve as the primary storage unit/main memory. Memory hierarchy 1505 may also have a memory controller or memory management unit not shown). Memory hierarchy 1505 can store data and instructions, and provide other components, such as computing unit 1502 and interconnect 1507, with high speed access to the stored data and instructions. Interconnect unit 1507 can communicate data between HCU 1502 and other external components, such as host unit or another HCU. Interconnect unit 1507 can include a PCIe interface 1508 and an inter-chip connection 1509. PCIe interface 1508 provides communication between HCU and host unit 1510 or Ethernet. Inter-chip connection 1509 servers as an inter-chip bus, connecting the HCU with other devices, such as other HCUs, the off-chip memory or peripherals. The memory management unit of memory hierarchy 1505 may also have a prefetching engine (not shown), such as prefetching engine 1011 in FIG. 10. The prefetching engine in the memory management unit may control the amount of pages prefetched from host memory 1511.

Controller 1506 can control and coordinate the operations of other components such as computing unit 1502, interconnect unit 1507 and memory hierarchy 1505. For example, controller 1506 can control dot product engine 1503 or vector engine 1504 in computing unit 1502 and interconnect unit 1507 to facilitate the parallelization among these components.

Host memory 1511 can be off-chip memory such as a host CPU's memory. For example, host memory 1511 can be a DDR memory (e.g., DDR SDRAM) or the like. Host memory 1511 can be configured to store a large amount of data with slower access speed, compared to the on-chip memory integrated within one or more processors, acting as a higher-level cache. Host unit 1510 can be one or more processing units (e.g., an X86 CPU). In some embodiments, a host system having host unit 1510 and host memory 1511 can comprise a compiler (not shown). The compiler is a program or computer software that transforms computer codes written in one programming language into instructions for HCU 1501 to create an executable program. In machine learning applications, a compiler can perform a variety of operations, for example, pre-processing, lexical analysis, parsing, semantic analysis, conversion of input programs to an intermediate representation, code optimization, and code generation, or combinations thereof.

Figure 16:
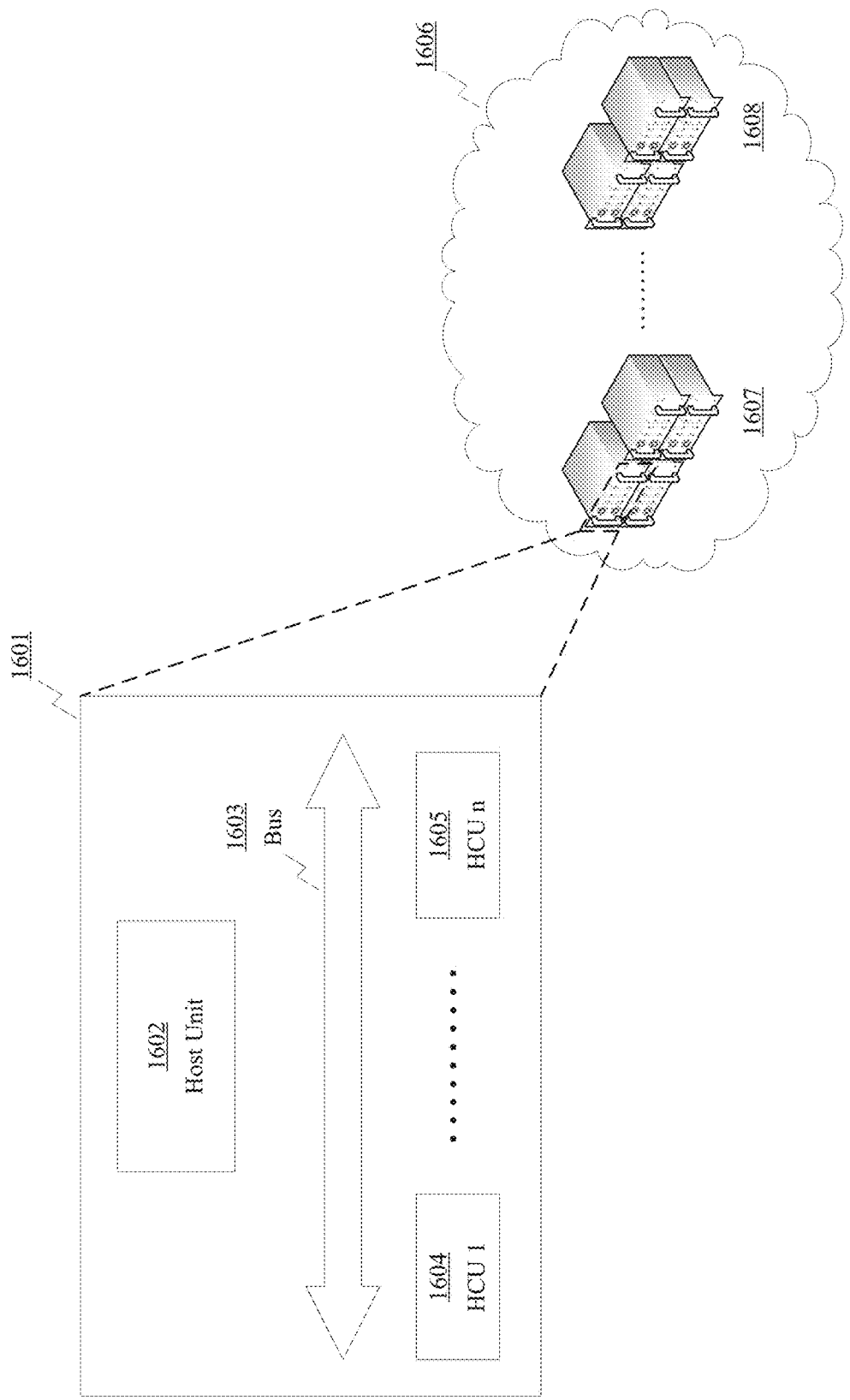
FIG. 16 illustrates a schematic diagram of an exemplary cloud system incorporating an accelerator, according to embodiments of the present disclosure.

FIG. 16 illustrates a schematic diagram of an exemplary cloud system 1606 incorporating neural network processing architecture 1601, according to embodiments of the present disclosure. As shown in FIG. 16, cloud system 1606 can provide cloud service with artificial intelligence (AI) capabilities and can include a plurality of computing servers (e.g., computing servers 1607 and 1608). In some embodiments, a computing server 1607 can, for example, incorporate accelerator architectures 1300 (FIG. 13) or 1500 (FIG. 15). Neural network processing architecture 1601 is shown in FIG. 16 as a simplified version of accelerator architecture 1500 for simplicity and clarity.

With the assistance of neural network processing architecture 1500, cloud system 1606 can provide the extended AI capabilities of image recognition, facial recognition, translations, 3D modeling, and the like. It is appreciated that, neural network processing architecture 1500 can be deployed to computing devices in other forms. For example, neural network processing architecture 1500 can also be integrated in a computing device, such as a smart phone, a tablet, and a wearable device. Moreover, while a specific architecture is shown in FIGS. 13-16, it is appreciated that any HCU or any accelerator that provides the ability to perform parallel computation can be used.

FIG. 17 is a simplified diagram illustrating how the prefetch granularity size may be decided and set by a host system, such as through a device driver. More precisely, FIG. 17 shows how a driver 1710 for an accelerator 1701 may be executed by CPU 1722 of host system 1721 to allow the host 1720 to interface with the accelerator 1701. In particular, host system 1721 may utilize the memory management component 1711 of driver 1710 to determine the prefetch granularity size for retrieving a page referenced in a page fault. According to FIG. 17, GMMU 1703 of graphical processing unit (GPU) 1702 may send information on a page fault to the memory management component 1711 of driver 1710, along with kernel information (e.g., information about the kernel that triggered the page fault) and memory state information (e.g., information on the memory usage of the accelerator's primary storage unit).

Memory management component 1711 may respond to the page fault through page fault handler 1713, which may trigger memory management component 1711 to use accelerator activity handler 1715 to assess the activity of the accelerator based on the accelerator's memory stage and the kernel info (e.g., the information about the processes running on the accelerator). In some embodiments, accelerator activity handler 1715 may be software executed on CPU 1722 that analyzes the current state and usage the accelerator's PSU (or be provided this information as part of the page fault) to produce an assessment of the accelerator's activity. Based on the activity assessment of accelerator activity handler 1715 and the pages requested in the page fault, prefetch granularity handler 1717 may determine a prefetch granularity size. In some embodiments, prefetch handler 1717 may be software executed on CPU 1722 that uses the assessment produced by activity assessment handler 1715 to determine the number of pages—if any—to prefetch.

Next, data migration control module 1714 may then retrieve a prefetch granularity-sized chunk of pages that contains the first page of data referenced in the page fault. These pages may be retrieved from the memory sub-system 1723 of host system 1721, possibly by interfacing with CPU 1722. In some embodiments, the prefetch granularity-sized chunk of pages may be byte aligned to the prefetch granularity size (e.g., if the prefetch granularity size is 64 KiB, then the chunk of pages is 64 KiB-byte aligned). Finally, data migration control module 1714 may then transmit these pages (e.g., perform page migration) to the GPU.

In some embodiments, the prefetch granularity size may be based on an evaluation of how often the pages neighboring the first page of data that was referenced in the page fault have been fetched and subsequently evicted in a certain span of time. This may be useful, for example, to detect instance where a page is repeatedly prefetched but not used. This may also be useful, for example, to detect instances of page thrashing (e.g., when a page is frequently evicted and then fetched, causing performance degradation). In some embodiments, this may involve, for example, logging which pages are removed. These logs could also include a time-stamp on when the removal occurred, could only keep the x most recent entries, could only keep entries for a certain amount of time, or could only keep an entries for x number of page fetches. In some embodiments, the log of removed pages (or other method of tracking which pages are removed) could be compared to pages that various potential prefetch granularity sizes would result in being prefetched.

Relatedly, in some embodiments, the prefetch granularity size may be based on an evaluation of the memory access patterns of the triggering kernel. For example, in some embodiments, the recent page references (e.g., virtual addresses contained in these pages) by the triggering kernel could be evaluated. If these references indicate that the pages being used by the triggering kernel are close to one another or exhibit spatial locality, then the prefetch granularity size may be increased (since the triggering kernel is likely use these pages, based in its past behavior). Conversely, if the references by the triggering kernel indicate that the references are to pages that are spread far apart from one another and which do not otherwise exhibit spatial locality, the prefetch granularity size may be decreased (since the triggering kernel is unlikely to use these pages, based on its past behavior). In a similar vein, all page references of the kernel (or some subset of them) may be evaluated to determine an overall trend of whether the kernel's page accesses tend to exhibit spatial locality.

In some embodiments, the prefetch granularity size may be determined for every attempt to access a page of data that is not stored on the accelerator's primary storage unit (e.g., for every page fault). In contrast, in some embodiments, the prefetch granularity size may not be determine for every page fault. For example, in some embodiments, the prefetch granularity size may be statically set for every kernel at the beginning of the kernel's execution. In other embodiments, the prefetch granularity size may instead only be altered at set intervals. For example, in some embodiments, the prefetch granularity size may only be altered after a certain amount of time has passed or a certain number of page faults have occurred. Similarly, in some embodiments, the page granularity size may be altered at the occurrence of certain events. As an example, some embodiments may update the prefetch granularity size when a certain number of page faults occurs within a certain interval of time (which could indicate, for instance, that page thrashing is occurring).

In some embodiments, the prefetch granularity size may be based on the prefetch granularity size used in responding to the previous page fault caused by the triggering kernel. Additionally, in some embodiments may, the prefetch granularity size may also be based on a fetching strategy. In some embodiments, the fetching strategy may be based on an evaluation of the number of pages of data neighboring the first page of data that have already been retrieved and are currently stored on the accelerator's primary storage unit. In some embodiments, the fetching strategy may be based on an evaluation of the likelihood that the pages of data neighboring the first page of data are likely to be accessed within a set time range. In some embodiments, the fetching strategy may be based on an evaluation of the spatial locality of the pages of data being accessed/used with a certain time span by the triggering kernel.

In some embodiments, the prefetch granularity size may be integer multiples of two (e.g., $2^1$, $2^2$, $2^3$, . . . ). Relatedly, in some embodiments, the prefetch granularity-sized chunk of contiguous pages may be byte aligned to the prefetch granularity size (e.g., if the prefetch granularity size is 64 KiB, then the chunk of pages is 64 KiB-byte aligned). In other words, the prefetch granularity-sized chunk may start at a memory address that is a multiple of the prefetch granularity size. As an example, if the prefetch granularity size is 512 kb, then the prefetch granularity-sized chunk can start at a virtual memory address ending with 8000 (e.g., 0xXXXXXXXXXXXX80000) or with 00000 (e.g., 0xXXXXXXXXXXXX00000). In general, the page that is being fetched (as opposed to the surrounding pages being prefetched) may appear anywhere within the prefetch granularity-sized chunk; the page could appear at the beginning (meaning all prefetched pages follow it), at the end (meaning all prefetched pages precede it) or somewhere in between (meaning prefetched pages both precede and follow it).

Figure 18:
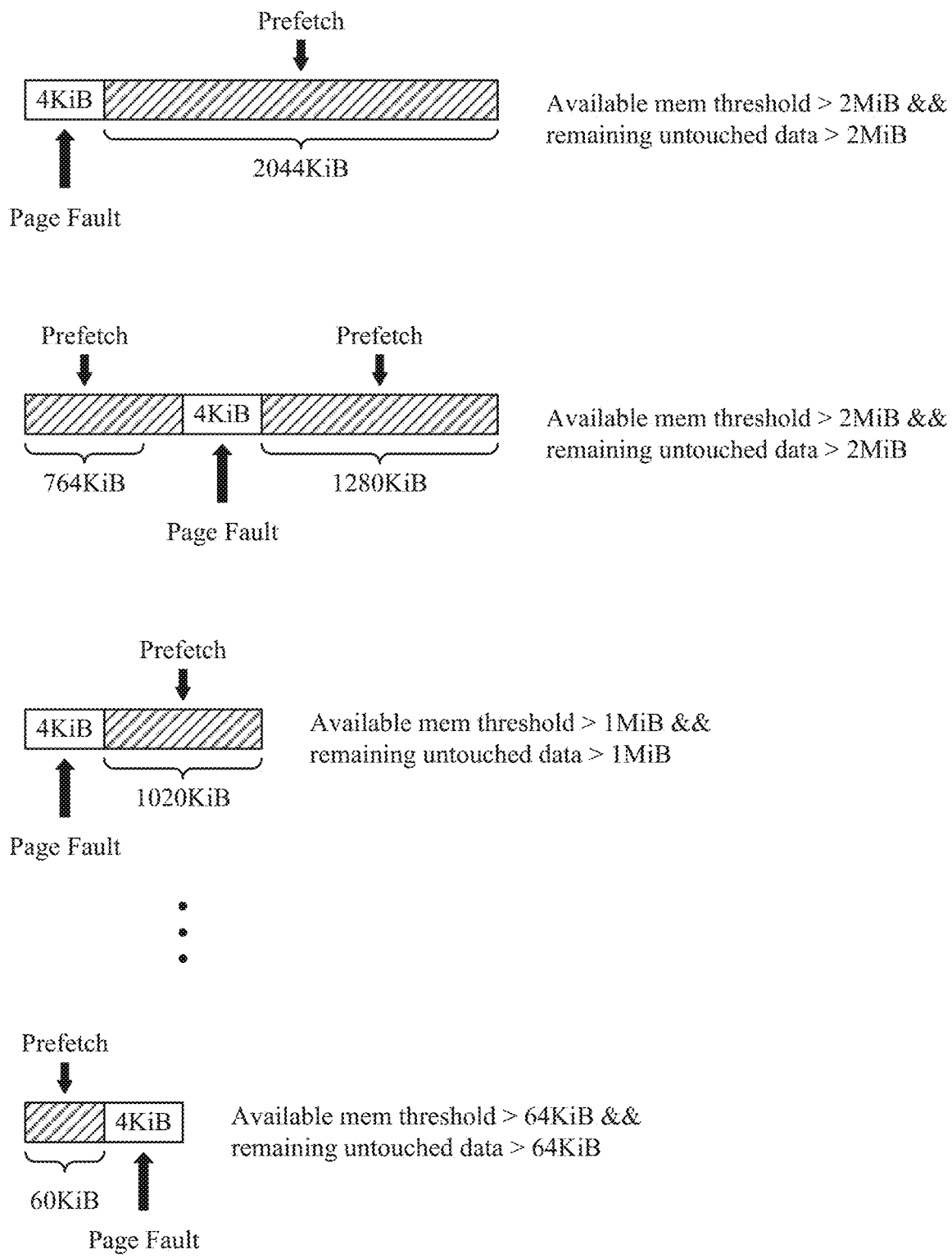
FIG. 18 illustrates a byte aligned chunk of contiguous pages, according to some embodiments of the present disclosure.

FIG. 18 illustrates a byte aligned chunk of contiguous pages, according to some embodiments of the present disclosure. As shown by FIG. 18, the page that is being fetched (e.g., the page that was referenced in the page fault) may appear at the beginning, middle, or end of the chunk of pages. Also shown by FIG. 18 is how the prefetch granularity size may vary based on the amount of the primary storage unit's memory that is currently being used and the number of pages that have not yet been fetched.

In some embodiments, an attempt to access a page of data that is not stored on the accelerator's PSU (e.g., a page fault) may be responded to immediately. In some other embodiments, the page fault may not be responded to immediately. For example, in some embodiments, a page fault may only be responded to after a certain amount of time has passed since receiving the page fault. In some embodiments, a page fault may only be responded to at set intervals. For example, in some embodiments, the page fault may only be responded to every x number of microseconds.

In some embodiments, multiple attempts to access pages of data that are not stored on the accelerator's PSU may be coalesced (e.g., merged together). For example, in some embodiments, after receiving a first page fault, but before responding to it, a second page fault may be received from the same triggering kernel. In some embodiments, when multiple page faults from the same kernel have been received but not yet responded to, the two page faults may be coalesced together (e.g., by coalescing unit 1105 of FIG. 11 or by coalescing handler 1716 of FIG. 17). For instance, in some embodiments, the first page (referenced by the first page fault) and the second page (referenced by the second page fault) may be compared. If the two pages of data are sufficiently close to one another, the prefetch granularity size may be set so that the pages prefetched with the first page of data include the second page of data. Whether the prefetch granularity size may be set to a sufficiently large size to prefetch the second page of data along with the first page of data may depend on the assessed activity of the accelerator. In some embodiments, if the prefetch granularity size is not set to a size such that the second page of data is prefetched along with the first page of data, the page faults may not be coalesced.

Relatedly, in some embodiments, a second page fault may be received after a first page fault is received, the prefetch granularity size determined, and the process of retrieving the chunk of pages started. In this case, in some embodiments, it may be determined whether the page of data referenced in the second page fault is contained within the prefetch granularity-sized chunk of pages being retrieved in respond to the first page fault. If the page referenced in the second page fault is included within this chunk of pages, the second page fault may be coalesced with the first page fault, since the second page of data is already being retrieved as part of responding to the first page fault.

In some embodiments, the prefetch granularity size may be set to the size of the first page of data (e.g., set so that no pages are being prefetched and only the first page of data is being fetched). In some embodiments, this may be done when the accelerator's primary storage unit is nearing a certain capacity threshold (e.g., when less than 5% of the accelerator's PSU is unused). In some embodiments, the prefetch granularity size may be set to the size of the first page of data when the kernel utilizing the first page of data is nearing a certain amount of pages (in terms of data) stored on the accelerator's PSU. This may be in relative terms (e.g., when the kernel is using more than 40% of the accelerator's PSU's storage capacity) or in absolute terms (when the kernel is using more than 10 GiB of the accelerator's PSU).

In some embodiments, the retrieval of the one or more pages of data was triggered by a kernel being executed on the accelerator attempting to access one or more of the referenced pages.

In some embodiments, the memory system from which the pages are retrieved may be the primary storage unit of a host system (e.g., the system in which the accelerator is operating). In some of these embodiments, both the accelerator and host system may be implementing a unified virtual memory system.

In some embodiments, the accelerator may be a graphics processing unit (GPU), a neural processing unit (NPU), a tensor processing unit (TPU), a field programmable gate array (FPGA), or an application-specific integrated circuit (ASIC), or other heterogeneous accelerator unit.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A method for fetching data for an accelerator, the method comprising:
  detecting an attempt to access a first page of data that is not stored on a primary storage unit of the accelerator; and
  responsive to detecting the attempt to access the first page of data:
    assessing activity of the accelerator;
    determining, based on the assessed activity of the accelerator, a prefetch granularity size; and
    transferring a chunk of contiguous pages of data of the prefetch granularity size from a memory system connected to the accelerator into the primary storage unit, wherein the transferred chunk of contiguous pages of data include the first page of data.

2. The method of clause 1, wherein the prefetch granularity size is based on a previous prefetch granularity size used in responding to a previous page fault caused by a triggering kernel.

3. The method of any of clauses 1-2, further comprising:
  detecting a second attempt to access a second page of data that is not stored on a primary storage unit of the accelerator; and
  based on the proximity of the first page of data and second page of data, coalescing the page faults and setting the prefetch granularity size such that the chunk of contiguous pages of data includes the first page of data and the second page of data.

4. The method of any of clauses 1-3, wherein the prefetch granularity size is the size of the first page of data when the amount of the accelerator's primary storage unit not being used by any kernel being executed on the accelerator is less than 5% of the primary storage unit's capacity.

5. The method of any of clauses 1-4, wherein the chunk of contiguous pages of data is byte-aligned to the prefetch granularity size.

6. The method of clause 5, wherein the prefetch granularity size is 64 KiB, 128 KiB, 256 KiB, 512 KiB, 1 MiB, 2 MiB, 4 MiB, 8 MiB, or 16 MiB.

7. The method of any of clauses 1-6, wherein:
  the prefetch granularity size is based on a fetching strategy; and
  the fetching strategy is based on:
    the number of pages of data neighboring the first page of data already stored on the primary storage unit,
    the likelihood that the pages of data neighboring the first page of data are likely to be accessed within a set time range, or
    a spatial locality of the pages of data being used by a triggering kernel, wherein the triggering kernel is being executed on the accelerator and attempted to access the first page of data.

8. The method of any of clauses 1-7, wherein detecting the attempt to access the first page of data comprises receiving a page fault triggered by a triggering kernel attempting to access the first page of data.

9. The method of any of clauses 1-8, wherein:
  the memory system is a primary storage unit of a host system, and
  the accelerator and host system use a unified virtual memory system.

10. The method of any of clauses 1-9, wherein the activity of the accelerator comprises:
  the amount of the accelerator's primary storage unit being used by a triggering kernel being executed on the accelerator, wherein the triggering kernel triggered the access to the first page of data,
  the amount of the accelerator's primary storage unit being used by any kernel being executed on the accelerator that is not the triggering kernel,
  the amount of the accelerator's primary storage unit not being used by any kernel being executed on the accelerator that is not the triggering kernel,
  the amount of the accelerator's primary storage unit not being used by any kernel being executed on the accelerator that is not the triggering kernel,
  the memory access patterns amount of the triggering kernel, or
  the memory access patterns amount of any kernel being executed on the accelerator that is not the triggering kernel.

11. A system for fetching data for an accelerator, the system comprising:
  a primary storage unit configured to hold a plurality of pages of data;
  a detection unit configured to detect an attempt to access a first page of data that is not stored on the primary storage unit;

an assessment unit configured to assess activity of the accelerator in response to the detecting unit detecting the attempt to access the first page of data;

a determining unit configured to determine, in response to the detecting unit detecting the attempt to access the first page of data, a prefetch granularity size, wherein the determination of the prefetch granularity size is based on the assessed activity of the accelerator; and a fetching unit configured to transfer a chunk of contiguous pages of data of the prefetch granularity size from a memory system connected to the accelerator into the primary storage unit, wherein the transferred chunk of contiguous pages of data include the first page of data.

12. The system of clause 11, wherein the prefetch granularity size is based on a previous prefetch granularity size used in responding to a previous page fault caused by a triggering kernel.

13. The system of any of clauses 11-12, further comprising a coalescing unit, and wherein:

the detection unit is further configured to detect a second attempt to access a second page of data that is not stored on a primary storage unit of the accelerator;

the coalescing unit is configured to coalesce, based on the proximity of the first page of data and second page of data, the page faults; and the determining unit is further configured to set the prefetch granularity size such that the chunk of contiguous pages of data includes the first page of data and the second page of data.

14. The system of any of clauses 11-13, wherein the chunk of contiguous pages of data is byte-aligned to the prefetch granularity size.

15. The system of any of clauses 11-14, wherein:

the prefetch granularity size is based on a fetching strategy; and the fetching strategy is based on:

the number of pages of data neighboring the first page of data already stored on the primary storage unit, the likelihood that the pages of data neighboring the first page of data are likely to be accessed within a set time range, or a spatial locality of the pages of data being used by a triggering kernel, wherein the triggering kernel is being executed on the accelerator and attempted to access the first page of data.

16. A non-transitory computer readable medium that stores a set of instructions that is executable by at least one processor of a computer system to cause the computer system to perform a method for fetching data for an accelerator, the method comprising:

detecting an attempt to access a first page of data that is not stored on a primary storage unit of the accelerator; and responsive to detecting the attempt to access the first page of data:

assessing activity of the accelerator;

determining, based on the assessed activity of the accelerator, a prefetch granularity size; and transferring a chunk of contiguous pages of data of the prefetch granularity size from a memory system connected to the accelerator into the primary storage unit, wherein the transferred chunk of contiguous pages of data include the first page of data.

17. The non-transitory computer readable medium of clause 16, wherein the prefetch granularity size is based on a previous prefetch granularity size used in responding to a previous page fault caused by a triggering kernel.

18. The non-transitory computer readable medium of any of clauses 16-17, wherein the set of instructions is executable by the at least one processor of the computer system to cause the computer system to further perform:

detecting a second attempt to access a second page of data that is not stored on a primary storage unit of the accelerator; and based on the proximity of the first page of data and second page of data, coalescing the page faults and setting the prefetch granularity size such that the chunk of contiguous pages of data includes the first page of data and the second page of data.

19. The non-transitory computer readable medium of any of clauses 16-18, wherein the chunk of contiguous pages of data is byte-aligned to the prefetch granularity size.

20. The non-transitory computer readable medium of any of clauses 16-19, wherein:

the prefetch granularity size is based on a fetching strategy; and the fetching strategy is based on:

the number of pages of data neighboring the first page of data already stored on the primary storage unit, the likelihood that the pages of data neighboring the first page of data are likely to be accessed within a set time range, or a spatial locality of the pages of data being used by a triggering kernel, wherein the triggering kernel is being executed on the accelerator and attempted to access the first page of data.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The devices, modules, and other functional units described in this disclosure can be implemented by hardware, or software, or a combination of hardware and software. One of ordinary skill in the art will also understand that the above described devices, modules, and other functions units may be combined or may be further divided into a plurality of sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for fetching data for an accelerator, the method comprising:
   detecting a first attempt to access a first page and a second attempt to access a second page of data that is not stored on a primary storage device of the accelerator; and
   responsive to detecting the first attempt to access the first page and the second attempt to access the second page of the data:
   assessing activity of the accelerator;
   determining, based on the assessed activity of the accelerator and a proximity of the first page and the second page of the data, a prefetch granularity size, wherein determining the prefetch granularity size comprises coalescing page faults and setting the prefetch granularity size such that a chunk of contiguous pages of data includes the first page and the second page of the data; and
   transferring the chunk of contiguous pages of data of the prefetch granularity size from a memory system connected to the accelerator into the primary storage device, wherein the transferred chunk of contiguous pages of data of the prefetch granularity size includes the first page and the second page of the data.

2. The method of claim 1, wherein the prefetch granularity size is based on a previous prefetch granularity size used in responding to a previous page fault caused by a triggering kernel.

3. The method of claim 1, wherein the prefetch granularity size is the size of the first page of data when the amount of the accelerator's primary storage device not being used by any kernel being executed on the accelerator is less than 5% of the primary storage device's capacity.

4. The method of claim 1, wherein the chunk of contiguous pages of data is byte-aligned to the prefetch granularity size.

5. The method of claim 4, wherein the prefetch granularity size is 64KiB, 128KiB, 256KiB, 512KiB, 1MiB, 2MiB, 4MiB, 8MiB, or 16MiB.

6. The method of claim 1, wherein:
   the prefetch granularity size is based on a fetching strategy; and
   the fetching strategy is based on:
   the number of pages of data neighboring the first page of data already stored on the primary storage device,
   the likelihood that the pages of data neighboring the first page of data are likely to be accessed within a set time range, or
   a spatial locality of the pages of data being used by a triggering kernel, wherein the triggering kernel is being executed on the accelerator and attempted to access the first page of data.

7. The method of claim 1, wherein detecting the attempt to access the first page of data comprises receiving a page fault triggered by a triggering kernel attempting to access the first page of data.

8. The method of claim 1, wherein:
   the memory system is a primary storage device of a host system, and
   the accelerator and host system use a unified virtual memory system.

9. The method of claim 1, wherein the activity of the accelerator comprises:
   the amount of the accelerator's primary storage device being used by a triggering kernel being executed on the accelerator, wherein the triggering kernel triggered the access to the first page of data,
   the amount of the accelerator's primary storage device being used by any kernel being executed on the accelerator that is not the triggering kernel,
   the amount of the accelerator's primary storage device not being used by any kernel being executed on the accelerator that is not the triggering kernel,
   the amount of the accelerator's primary storage device not being used by any kernel being executed on the accelerator that is not the triggering kernel,
   the memory access patterns amount of the triggering kernel, or
   the memory access patterns amount of any kernel being executed on the accelerator that is not the triggering kernel.

10. A system for fetching data for an accelerator, the system comprising:
    a memory device storing an instruction; and
    one or more processors configured to execute the instruction stored in the memory device to cause the system to perform:
    detect a first attempt to access a first page and a second attempt to access a second page of data that is not stored on a primary storage device of the accelerator;
    assess activity of the accelerator in response to a detection of the first attempt to access the first page and the second attempt to access the second page of the data;
    determine, in response to the detection of the first attempt to access the first page and the second attempt to access the second page of the data, a prefetch granularity size, wherein the determination of the prefetch granularity size is based on the assessed activity of the accelerator and a proximity of the first page and the second page of the data, and the determining further comprises coalescing page faults and setting the prefetch granularity size such that a chunk of contiguous pages of data includes the first page and the second page of the data; and
    transfer the chunk of contiguous pages of data of the prefetch granularity size from a memory system connected to the accelerator into the primary storage device, wherein the transferred chunk of contiguous pages of data of the prefetch granularity size includes the first page and the second page of the data.

11. The system of claim 10, wherein the prefetch granularity size is based on a previous prefetch granularity size used in responding to a previous page fault caused by a triggering kernel.

12. The system of claim 10, wherein the chunk of contiguous pages of data is byte-aligned to the prefetch granularity size.

13. The system of claim 10, wherein:
the prefetch granularity size is based on a fetching strategy; and
the fetching strategy is based on:
the number of pages of data neighboring the first page of data already stored on the primary storage device,
the likelihood that the pages of data neighboring the first page of data are likely to be accessed within a set time range, or
a spatial locality of the pages of data being used by a triggering kernel, wherein the triggering kernel is being executed on the accelerator and attempted to access the first page of data.

14. A non-transitory computer readable medium that stores a set of instructions that is executable by at least one processor of a computer system to cause the computer system to perform a method for fetching data for an accelerator, the method comprising:
detecting a first attempt to access a first page and a second attempt to access a second page of data that is not stored on a primary storage device of the accelerator; and
responsive to detecting the first attempt to access the first page and the second attempt to access the second page of the data:
assessing activity of the accelerator;
determining, based on the assessed activity of the accelerator and a proximity of the first page and the second page of the data, a prefetch granularity size, wherein determining the prefetch granularity size comprises coalescing page faults and setting the prefetch granularity size such that a chunk of contiguous pages of data includes the first page and the second page of the data; and
transferring the chunk of contiguous pages of data of the prefetch granularity size from a memory system connected to the accelerator into the primary storage device, wherein the transferred chunk of contiguous pages of data of the prefetch granularity size includes the first page and the second page of the data.

15. The non-transitory computer readable medium of claim 14, wherein the prefetch granularity size is based on a previous prefetch granularity size used in responding to a previous page fault caused by a triggering kernel.

16. The non-transitory computer readable medium of claim 14, wherein the chunk of contiguous pages of data is byte-aligned to the prefetch granularity size.

17. The non-transitory computer readable medium of claim 14, wherein:
the prefetch granularity size is based on a fetching strategy; and
the fetching strategy is based on:
the number of pages of data neighboring the first page of data already stored on the primary storage device,
the likelihood that the pages of data neighboring the first page of data are likely to be accessed within a set time range, or
a spatial locality of the pages of data being used by a triggering kernel, wherein the triggering kernel is being executed on the accelerator and attempted to access the first page of data.

* * * * *